US012466030B2

(12) United States Patent
Thomas et al.

(10) Patent No.: US 12,466,030 B2
(45) Date of Patent: Nov. 11, 2025

(54) DEAD MAN CONTROL ARRANGEMENT

(71) Applicant: BLASTONE TECHNOLOGY PTY LTD, Queensland (AU)

(72) Inventors: Graeme Thomas, Queensland (AU); Rick Gooden, Queensland (AU); Matthew Rowland, Queensland (AU); Trevor Seewald, Queensland (AU)

(73) Assignee: BLASTONE TECHNOLOGY PTY LTD, Queensland (AU)

( * ) Notice: Subject to any disclaimer, the term of this patent is extended or adjusted under 35 U.S.C. 154(b) by 756 days.

(21) Appl. No.: 17/626,597

(22) PCT Filed: Jul. 11, 2020

(86) PCT No.: PCT/AU2020/050720
§ 371 (c)(1),
(2) Date: Jan. 12, 2022

(87) PCT Pub. No.: WO2021/007613
PCT Pub. Date: Jan. 21, 2021

(65) Prior Publication Data

US 2022/0379435 A1 Dec. 1, 2022

(30) Foreign Application Priority Data

Jul. 12, 2019 (AU) ................................ 2019902480

(51) Int. Cl.
*B24C 7/00* (2006.01)
*B24C 5/04* (2006.01)
*H01H 21/10* (2006.01)

(52) U.S. Cl.
CPC ........... *B24C 7/0053* (2013.01); *H01H 21/10* (2013.01); *B24C 5/04* (2013.01); *H01H 2300/026* (2013.01)

(58) Field of Classification Search
CPC .......... F16K 11/00; B24C 7/0053; B24C 5/04
See application file for complete search history.

(56) References Cited

U.S. PATENT DOCUMENTS 3,834,082 A 9/1974 Grudzinski
D260,232 S * 8/1981 Simons ........................ D13/173
(Continued)

FOREIGN PATENT DOCUMENTS

CA 3052004 A1 8/2018
EP 2457690 A1 * 5/2012 ........... B24C 7/0053
(Continued)

OTHER PUBLICATIONS

Big Clem Bulk Blast Machines, Clemco Industries Corp., Manual No. 05110, Rev. J, as early as May 1, 1971, pp. 1-27.
(Continued)

*Primary Examiner* — Jessica Cahill
(74) *Attorney, Agent, or Firm* — Jordan IP Law, LLC

(57) ABSTRACT

A nozzle arrangement for use in expelling pressurized fluid includes a dead man control. The dead man control has a manually operable control part movable between a non-operating position, which prevents operation of the nozzle arrangement, and an operating position, and biased towards the non-operating position. The manually operable control part is pivotably coupled relative to a nozzle holder of the nozzle arrangement, which extends away from the pivotal coupling substantially towards a distal end of a nozzle part of the nozzle arrangement. The manually operable control part includes a handle part which in the operating position is substantially against and aligned with the nozzle part.

20 Claims, 21 Drawing Sheets

(56) References Cited

U.S. PATENT DOCUMENTS

| | | | | |
|---|---|---|---|---|
| 5,319,894 | A | 6/1994 | Shank, Jr. et al. | |
| 5,319,946 | A * | 6/1994 | Manificat | B24C 1/083 451/39 |
| 5,381,962 | A * | 1/1995 | Teague | B08B 3/026 239/525 |
| 5,542,873 | A | 8/1996 | Shank, Jr. et al. | |
| 10,758,933 | B2 * | 9/2020 | Young, II | B05B 12/02 |
| 11,548,115 | B2 * | 1/2023 | Nguyen | B24C 7/0046 |
| 2004/0262138 | A1 * | 12/2004 | Lee | H01H 9/06 200/293 |
| 2006/0011457 | A1 * | 1/2006 | Robertson | B24C 5/02 200/51 LM |
| 2013/0309943 | A1 | 11/2013 | Seyffert et al. | |
| 2015/0179368 | A1 * | 6/2015 | Roe | H01H 13/14 200/334 |
| 2017/0225297 | A1 * | 8/2017 | Trull, Jr. | B24C 7/0038 |
| 2018/0130613 | A1 * | 5/2018 | Nguyen | H01H 13/506 |
| 2019/0039209 | A1 | 2/2019 | Curran et al. | |

FOREIGN PATENT DOCUMENTS

| | | | | |
|---|---|---|---|---|
| WO | 2016144669 | A1 | 9/2016 | |
| WO | WO-2018140736 | A1 * | 8/2018 | B05B 7/1431 |

OTHER PUBLICATIONS

Third Party Observation against the European Application EP3996872, Schiweck Weinzierl Koch, Life Science, May 8, 2024.

Search Report from corresponding European Application No. EP 20840989.6, Jul. 28, 2022.

International Search Report and Written Opinion from PCT Application No. PCT/AU2020/050720, Oct. 20, 2020.

International Preliminary Report on Patentability from PCT Application No. PCT/AU2020/050720, Oct. 21, 2021.

Clemco Industries Corporation, 2016 Dealer/Distributor Price List (partial); pp. 1-6.†

* cited by examiner
† cited by third party

DEAD MAN CONTROL ARRANGEMENT

RELATED APPLICATIONS

The present application claims priority from Australian Provisional Patent Application No. 2019902480 filed 12 Jul. 2019, the disclosure of which is hereby incorporated herein in its entirety by reference.

FIELD

The present disclosure relates to a dead man control arrangement, and especially but not exclusively to a dead man control arrangement for controlling pneumatic blasting apparatus which provides particles of abrasive material in a stream of pressurised gas for blasting a surface in order to clean and/or abrade the surface.

BACKGROUND

It is known to provide a blasting apparatus in which particles of abrasive material entrained in a stream of pressurised gas are expelled from a nozzle so as to be forcibly directed, or blasted, onto a surface in order to clean and/or abrade the surface.

One commonly used abrasive material is sand, and when sand is used the blasting process may be referred to as sand blasting. However, other abrasive materials may be used, and garnet is often preferred to silica sand.

A user of abrasive blasting apparatus may hold the nozzle to which a pressurised gas with abrasive entrained therein is fed by a hose. Operation of abrasive blasting apparatus is potentially dangerous, not least because the nozzles and associated apparatus at the user's end of the hose have substantial weight, and due to reaction forces from the expulsion of pressurised gas can move violently and unpredictably if inadvertently released by a user. Impact with the user, and/or expulsion of gas and abrasive onto the user may cause significant injury.

As well as use of protective clothing and other gear, such as helmets with visors, an approach to reducing risk to users is to incorporate a "dead man control" at or adjacent the nozzle. A dead man control is also sometimes known as a fast acting automatic cut-off device. Broadly speaking the dead man control, is a manual control, such as a lever, which must be forced to an operating position by the user in order to for pressurised gas and entrained abrasive to be ejected from the nozzle, and which returns to a non-operating position if released by the user. Thus the dead man control provides an automatic cut-off if a user inadvertently releases the handle, or the nozzle part of the apparatus as a whole.

A dead man control arrangement for use in abrasive blasting is schematically illustrated in FIG. 1(*a*) which illustrates an abrasive blasting apparatus, generally designated 1, as a whole.

The blasting apparatus 1 comprises a compressor 2 for supplying pressurised gas, in the form of compressed air and a blast pot 4 which contains an abrasive material 6, such as sand or particulate garnet. The compressor 2 is connected to the blast pot 4 by a suitable pneumatic hose 8, and is also connected to a nozzle arrangement 10 by a blast hose 12. In use, the blast pot 4 is pressurised by the compressor 2, as is blast hose 12, allowing the abrasive material 6 to be gravity fed into the blast hose 12 via a metering valve 14, so that it is entrained into the air flow in the blast hose 12 and fed to the nozzle arrangement 10.

The nozzle arrangement comprises a blast nozzle 16 connected to a nozzle holder 18, which is generally tubular and provides a passageway, for the air and abrasive, from the blast hose 12 to the blast nozzle 16. Attached to nozzle holder 18 is a valve body 20, and a control lever 22. An air supply line 24 provides a supply of pressurised air (provided by the compressor 2) to the valve body 20.

The valve body 20, illustrated schematically in FIG. 1(*b*) comprises an air inlet passage 25 connected to the air supply line 24, an air outlet passage 26 and a control valve 28. In its normal state control valve 28 is closed and prevents passage of air from the air inlet passage 25 to the air outlet passage 26. The air outlet passage 26 is connected to an air return line 30, which is connected to a remote valve arrangement 32, close to the blast pot 4. The remote valve arrangement 32 controls flow of compressed air from the compressor 2 to the blast hose 12, and is configured to prevent flow of compressed air into the blast hose 12 unless activated by positive air pressure from the air return line 30. Thus when the control valve 28 is closed (which is its normal condition) flow of air into the blast hose 12, and thus flow of air and entrained abrasive from the blast nozzle 16 is prevented, and operation of the blasting apparatus 1 is prevented.

The control valve 28 can be opened, to allow flow of air from the air inlet passage 25 to the air outlet passage 26, and via the return line 30 to the remote valve arrangement 32, by a user forcing the control lever 22 from the non-operating position to the operating position, pressed against the valve body (that is, rotated about 30 degrees anti-clockwise from the position shown in FIG. 1(*a*).

As foreshadowed above, the control lever 22 returns to a non-operating position if released by the user, and when this occurs the control valve 28 closes, thus preventing flow of air to the outlet passage 26, the air return line 30 and the remote valve arrangement 32, and thus effectively and rapidly stopping operation of the blasting apparatus 1.

The valve body 20, control valve 28, control lever 22, air supply line 24, air return line 30 and remote valve arrangement 32 thus together provide a dead man control for the abrasive blasting apparatus 1. It will be appreciated that the described arrangement is designed to be reasonably failsafe, in that positive air pressure from the dead man control (effectively a positive return signal) is required in order for the blasting apparatus to operated, so that blockage, rupturing or disconnection of the air supply line 24 and/or air return line 30 will prevent, rather than allow, operation of the blasting apparatus 1.

While the described arrangement is considered effective in mitigating risk in using abrasive blasting apparatus, it has been discerned that an improved, or at least useful alternative, dead man control arrangement is desirable.

Apparatus other than abrasive blasting apparatus may include a dead man control. Accordingly, although the present disclosure is made with particular reference to abrasive blasting apparatus, it should be appreciated that applicability of the disclosure should not be considered to be limited solely to abrasive blasting.

Any references to methods, apparatus or documents of the prior art or related art are not to be taken as constituting any evidence or admission that they formed, or form, part of the common general knowledge.

SUMMARY

According to a first aspect of the present disclosure there is provided a dead man control arrangement comprising:

a manually operable control part movable between a non-operating position, which prevents operation of an associated apparatus, and an operating position, and biased towards the non-operating position;

a control signal governor which in response to the manually operable control part being in the operating position generates a first control signal for sending to a first remote controller arranged to allow a first operation of the associated apparatus only upon receipt of the first control signal;

wherein the dead man control arrangement, in response to the manually operable control part being in the operating position, provides a second control signal for sending to a second remote controller of the associated apparatus arranged to allow a second operation of the associated apparatus only upon receipt of the second control signal.

In an embodiment the dead man control arrangement further comprises a selector for selecting whether or not the second control signal is sent to the second remote controller.

In an embodiment the dead man control comprises a control body, and the control signal governor, and first and second outlets for the respective first and second control signals, are provided on or in the control body.

In an embodiment the manually operable control part is mounted to the control body.

In an embodiment the selector is mounted on or in the control body.

In an embodiment the control body is a valve body, providing a plurality of fluid passageways in fluid connection with a control valve.

In an embodiment the control signal governor comprises the control valve.

In an embodiment the associated apparatus is an abrasive blasting apparatus.

In an embodiment the first operation of the associated apparatus comprises provision of pressurised gas to a blasting nozzle.

In an embodiment the second operation of the associated apparatus comprises provision of an abrasive to a blasting nozzle.

In an embodiment the first control signal comprises pressurisation of a fluid.

In an embodiment the second control signal comprises pressurisation of a fluid.

In an embodiment the fluid comprises a gas.

In an embodiment the gas comprises air.

In an embodiment the control signal governor comprises a connection arrangement operable to be in a connection condition which connects an output part of the dead man control system to an input part of the dead man control system and operable to be in an alternative, disconnection, condition, in which the output part is disconnected from the input part of the dead man control system.

In an embodiment connection condition allows at least part of an input to the dead man control system to be transmitted to the output part of the dead man control system to thereby generate at least one of the first and second control signals in the output part.

In an embodiment the input is selected from the group comprising: a pressurised gas input; and an electrical input.

In an embodiment the connection arrangement is arranged to be in the disconnection condition in the absence of user input to retain it in the connection condition.

In an embodiment the connection arrangement comprises a valve.

In an embodiment the input part comprises an input transmission pathway.

In an embodiment the output part comprises an output transmission pathway.

In an embodiment the input part comprises a fluid passageway. The fluid passageway of the input part may comprise an input fluid transmission pathway.

In an embodiment the output part comprises a fluid passageway. The fluid passageway of the output part may comprise an output fluid transmission pathway.

In an embodiment the input part comprises an electrically conductive path. The electrically conductive path of the input part may comprise an electrical transmission pathway.

In an embodiment the connection arrangement comprises an electrical switch.

In an embodiment the first control signal comprises an electrical signal.

In an embodiment the second control signal comprises an electrical signal.

In an embodiment the output part comprises an electrically conductive path. The electrically conductive path of the output part may comprise an electrical transmission pathway.

In an embodiment the selector comprises a movable member, moveable between a position in which it prevents transmission of the second control signal and a position in which it allows transmission of the second control signal.

In an embodiment the selector comprises a toggle switch wherein the movable member comprises a toggle.

In an embodiment a shield is provided about the toggle to prevent inadvertent operation thereof.

In an embodiment the control signal comprises pressurisation of a fluid in a line connected to the remote controller.

According to a second aspect of the present disclosure there is provided a nozzle arrangement for use in expelling pressurised fluid, the nozzle arrangement comprising:

a generally tubular member comprising a fluid ingress region for receiving pressurised fluid supplied by a pressurised fluid conduit and a fluid egress region through which pressurised fluid can egress the generally tubular member, the fluid ingress region and the fluid egress region being in fluid communication; and a control arrangement mounted to the generally tubular member, the control arrangement including at least one manually operable control for selectively allowing and preventing supply of pressurised fluid to the generally tubular member;

wherein the control arrangement is mounted to the generally tubular member by connection to a rotatable member coupled to the generally tubular member so that the rotatable member can rotate about the generally tubular member, such that the control arrangement is rotatable about the generally tubular member.

In an embodiment the generally tubular member has an axis oriented in a direction which extends from the fluid ingress region to the fluid egress region, and the rotatable member is rotatable about the axis of the tubular member.

In an embodiment the nozzle arrangement further comprises a nozzle connected to the fluid egress region of the generally tubular member.

In an embodiment the nozzle arrangement is a nozzle arrangement for an abrasive blasting apparatus.

In an embodiment the rotatable member comprises a sleeve, which extends around at least part of the generally tubular member.

In an embodiment the generally tubular member provides a generally cylindrical outer surface part, and the sleeve comprises a generally cylindrical interior surface part.

In an embodiment the generally cylindrical interior surface part of the sleeve is slidable relative to the generally cylindrical outer surface part of the generally tubular member.

In an embodiment the nozzle arrangement comprises a retainer attachable to the generally tubular member to retain the rotatable member relative to the generally tubular member.

In an embodiment the control arrangement is a dead man control arrangement.

In an embodiment the control arrangement is a dead man control arrangement in accordance with the first aspect.

According to a third aspect of the present disclosure there is provided a nozzle arrangement for use in expelling pressurised fluid, the nozzle arrangement comprising a dead man control;

- wherein the dead man control comprises a manually operable control part movable between a non-operating position, which prevents operation of the nozzle arrangement, and an operating position, and biased towards the non-operating position;
- wherein the manually operable control part is pivotably coupled relative to a nozzle holder of the nozzle arrangement, which extends away from the pivotal coupling substantially towards a distal end of a nozzle part of the nozzle arrangement, and wherein the manually operable control part comprises a handle part which in the operating position is substantially against and aligned with the nozzle part.

In an embodiment, in the non-operating position the handle part is oriented so that it diverges away from the nozzle part as it extends away from the pivotable coupling.

In an embodiment, in the non-operating position the handle part is oriented so that it diverges at an angle of between about 2 degrees and about 20 degrees, relative to a longitudinal axis of the nozzle part.

In an embodiment, in the non-operating position the handle part is oriented so that it diverges at an angle of between about 3 degrees and about 20 degrees, relative to a longitudinal axis of the nozzle part.

In an embodiment, in the non-operating position the handle part is oriented so that it diverges at an angle of between about 4 degrees and about 20 degrees, relative to a longitudinal axis of the nozzle part.

In an embodiment, in the non-operating position the handle part is oriented so that it diverges at an angle of between about 2 degrees and about 15 degrees, relative to a longitudinal axis of the nozzle part.

In an embodiment, in the non-operating position the handle part is oriented so that it diverges at an angle of between about 3 degrees and about 15 degrees, relative to a longitudinal axis of the nozzle part.

In an embodiment, in the non-operating position the handle part is oriented so that it diverges at an angle of between about 4 degrees and about 15 degrees, relative to a longitudinal axis of the nozzle part.

In an embodiment, in the non-operating position the handle part is oriented so that it diverges at an angle of between about 5 degrees, relative to a longitudinal axis of the nozzle part.

In an embodiment the manually operable control part comprises an actuating part closer to the pivotable connection than is the handle part.

In an embodiment the manually operable control part comprises a transition part which connects the actuating part to the handle part.

In an embodiment the handle part is oriented at an angle of between about 2 degrees and about 20 degrees, relative to a direction of orientation of the actuating part.

In an embodiment the handle part is oriented at an angle of between about 3 degrees and about 20 degrees, relative to a direction of orientation of the actuating part.

In an embodiment the handle part is oriented at an angle of between about 4 degrees and about 20 degrees, relative to a direction of orientation of the actuating part.

In an embodiment the handle part is oriented at an angle of between about 2 degrees and about 15 degrees, relative to a direction of orientation of the actuating part.

In an embodiment the handle part is oriented at an angle of between about 3 degrees and about 15 degrees, relative to a direction of orientation of the actuating part.

In an embodiment the handle part is oriented at an angle of between about 4 degrees and about 15 degrees, relative to a direction of orientation of the actuating part.

According to a fourth aspect of the present disclosure there is provided a manually operable control part of a dead man control arrangement adapted to control fluid flow to a nozzle arrangement of an apparatus for expelling pressurised fluid via a nozzle, the manually operable control part comprising an elongate handle part having a slot therein, the slot having a length direction extending in the longitudinal direction of the handle part and having a width sufficient for a part of the nozzle to extend through the slot.

In an embodiment the slot has a width sufficient for a part of the nozzle to extend through the slot when the handle part is held by a user in an operating position of the dead man control arrangement.

In an embodiment the slot has a width sufficient for a part of the nozzle to extend through the slot when the handle part is substantially parallel with and retained against said nozzle.

In an embodiment the handle part comprises first and second handle portions, which at least partially define the slot therebetween.

In an embodiment the first and second handle portions are substantially mutually parallel.

In an embodiment the first and second handle portions are part cylindrical in transverse cross sectional shape.

According to a fifth aspect of the present disclosure there is provided a manually operable control part of a dead man control arrangement, the manually operable control part comprising an elongate handle part providing a terminal region provided with a hand retaining part which extends at an angle relative to the handle part, and which is adapted to facilitate retention of a hand of a user on the handle part.

In an embodiment the hand retaining part is adapted to facilitate retention of a hand of a user on the handle part, when the user is operating the dead man control arrangement.

In an embodiment the manually operable control part is for provision on a tool which in use imparts thrust on the handle part which may cause the handle part to slip through the hand of a user using the dead man control arrangement, and the hand retaining part is arranged and dimensioned to provide a substantial obstacle to said handle part to slipping through the hand of a user.

In an embodiment the hand retaining part extends at an angle relative to the handle part of no more than about 150 degrees.

In an embodiment the hand retaining part extends at an angle relative to the handle part of no more than about 120 degrees.

In an embodiment the hand retaining part extends at least 20 mm from the handle part in a direction oriented perpendicular to the direction of elongation of the handle part.

In an embodiment the hand retaining part extends at least 30 mm from the handle part in a direction oriented perpendicular to the direction of elongation of the handle part.

In an embodiment the hand retaining part extends at least 40 mm from the handle part in a direction oriented perpendicular to the direction of elongation of the handle part.

In an embodiment the hand retaining part extends at least 50 mm from the handle part in a direction oriented perpendicular to the direction of elongation of the handle part.

In an embodiment the dead man control arrangement is for use with a nozzle arrangement of an apparatus for expelling pressurised fluid via a nozzle.

In an embodiment the hand retaining part extends from the handle part by a distance, in a direction oriented perpendicular to the direction of elongation of the handle part, equal to at least a third of an external diameter of the nozzle.

In an embodiment the hand retaining part extends from the handle part by a distance, in a direction oriented perpendicular to the direction of elongation of the handle part, equal to at least about half of an external diameter of the nozzle.

In an embodiment the hand retaining part extends from the handle part by a distance, in a direction oriented perpendicular to the direction of elongation of the handle part, equal to at least about three quarters of an external diameter of the nozzle.

In an embodiment the hand retaining part extends from the handle part by a distance, in a direction oriented perpendicular to the direction of elongation of the handle part, equal to at least approximately an external diameter of the nozzle.

For the avoidance of doubt, the above (and any corresponding) statements quantifying the extension of the hand retaining part in a direction oriented perpendicular to the direction of elongation of the handle part should not be construed as requiring the hand retaining part to be oriented perpendicular to the direction of elongation of the handle part.

In an embodiment the manually operable control part comprises a second hand retainer part.

In an embodiment the manually operable control part provides a hand retaining loop to facilitate retention of a hand of a user on the handle part.

In an embodiment the hand retaining loop comprises the hand retainer part and the second hand retainer part.

According to a sixth aspect of the present disclosure there is provided a dead man control comprising:

- a control body provided with an engagement surface for engaging a receiving surface of an apparatus over which the dead man control system is to exert control;
- the control body providing at least one pathway between an inlet of the control body and an outlet of the control body for providing a control signal at the output in response to the dead man control being maintained in an operating position by a user,
- wherein the control body is configured so that in use disengagement of the engagement surface from the receiving surface prevents effective functioning of the pathway so that a control signal cannot be provided at the output.

In an embodiment the pathway comprises a number of passage parts for passage of a fluid from the inlet to the outlet.

In an embodiment at least one passage part is in fluid communication with an opening in the engagement surface.

In an embodiment escape of fluid through the opening, when the engagement surface is disengaged from the receiving surface, surface prevents effective functioning of the pathway.

In an embodiment flow of fluid through the opening is prevented, when the engagement surface is properly engaged with the receiving surface.

In an embodiment flow of fluid through the opening is prevented, when the engagement surface is properly engaged with the receiving surface, by the receiving surface occluding the opening.

In an embodiment a sealing member is provided at or adjacent the opening.

In an embodiment a seal accommodating arrangement is provided for assisting.

In an embodiment at least one fastener is provided for fastening the control body to the receiving surface.

In an embodiment at least one fastener comprises a threaded fastener.

In an embodiment at least one threaded fastener extends through or into the control body and through or into the receiving surface.

According to a seventh aspect of the present disclosure there is provided a nozzle arrangement for an abrasive blasting apparatus, the nozzle arrangement comprising the dead man control of the first aspect.

According to an eighth aspect of the present disclosure there is provided an abrasive blasting apparatus including a nozzle arrangement in accordance with the seventh aspect.

According to a ninth aspect of the present disclosure there is provided a dead man control arrangement comprising:

- a manually operable control part movable between a non-operating position, which prevents operation of an associated apparatus, and an operating position, and biased towards the non-operating position;
- wherein the dead man control arrangement is adapted to provide a first control signal for sending to a first remote controller arranged to allow a first operation of the associated apparatus only upon receipt of the first control signal; and
- wherein the dead man control arrangement is adapted to provide a second control signal for sending to a second remote controller of the associated apparatus arranged to allow a second operation of the associated apparatus only upon receipt of the second control signal.

According to a tenth aspect of the present disclosure there is provided an arrangement for use in expelling pressurised fluid, the arrangement comprising:

- a generally tubular member comprising a fluid ingress region for receiving pressurised fluid supplied by a pressurised fluid conduit and a fluid egress region through which pressurised fluid can egress the generally tubular member, the fluid ingress region and the fluid egress region being in fluid communication; and
- a control arrangement mounted to the generally tubular member, the control arrangement including at least one manually operable control for selectively allowing and preventing supply of pressurised fluid to the generally tubular member;
- wherein the control arrangement is mounted to the generally tubular member such that the control arrangement is rotatable about the generally tubular member.

In an embodiment the arrangement for use in expelling pressurised fluid is a nozzle arrangement.

In an embodiment the generally tubular member has an axis oriented in a direction which extends from the fluid ingress region to the fluid egress region.

In an embodiment the control arrangement is mounted to the generally tubular member by connection to a rotatable member coupled to the generally tubular member so that the rotatable member can rotate about the generally tubular member.

According to a further aspect of the present disclosure there is provided a method of operating a dead man control arrangement comprising use of an apparatus in accordance with any one or more of the preceding aspects.

It should be appreciated that features or characteristics of any aspect or embodiment thereof may be incorporated into any other aspect unless logic dictates otherwise.

BRIEF DESCRIPTION OF THE DRAWINGS

Embodiments in accordance with the present disclosure will be described, by way of example, in the following Detailed Description of Embodiments which provides sufficient information for those skilled in the art to perform the invention. The Detailed Description of Embodiments is not to be regarded as limiting the scope of the preceding Summary section in any way. Dimensions, angles and proportion of various parts and arrangements according to embodiments referred to in the preceding summary are incorporated into the following Detailed Description of embodiments as non-limiting examples. The Detailed Description will make reference to the accompanying drawings, by way of example, in which:

FIG. 1(*b*) is a schematic representation of part of the dead man control arrangement of FIG. 1(*a*);

FIG. 1(*c*) is a more technically detailed representation of a system of the type illustrated in FIG. 1(*a*);

FIG. 2 *b*) is a schematic representation of part of the dead man control arrangement of FIG. 2(*a*);

FIG. 2(*c*) is a more technically detailed representation of a system of the type illustrated in FIG. 2(*a*);

FIGS. 23(*b*) and 24(*b*) are line drawings corresponding substantially to FIGS. 23(*a*) and 24(*a*), respectively.

DETAILED DESCRIPTION OF EMBODIMENTS

With reference to the accompanying drawings embodiments of a blasting control arrangement in accordance with the present disclosure will now be described.

Figure 1A:
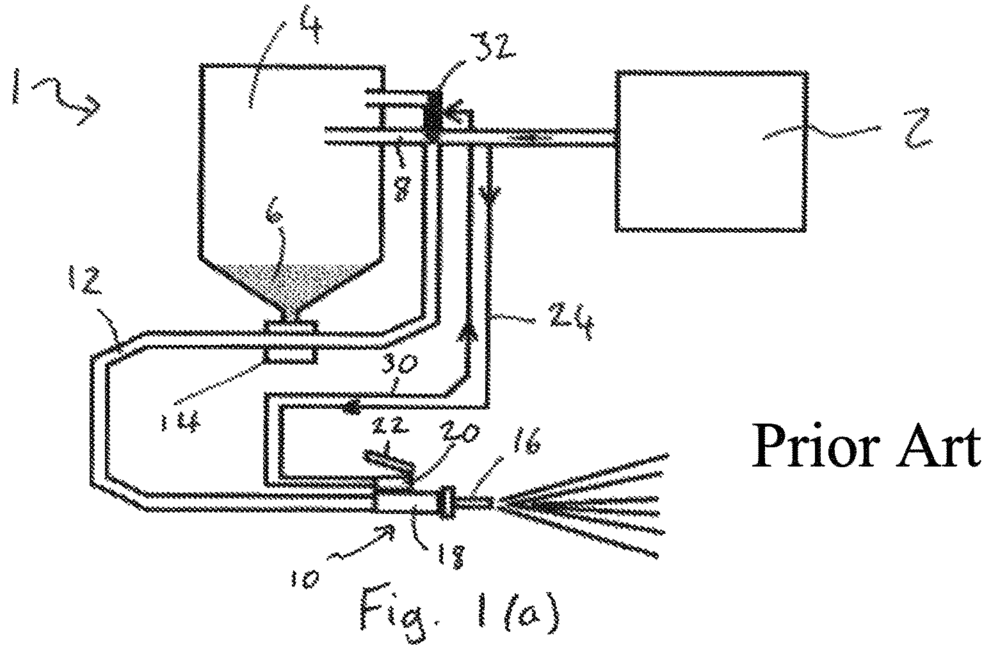
Prior Art Fig. 1(a)
FIG. 1(*a*) is a schematic representation of a previously used blasting apparatus including a previously used dead man control arrangement.
Figure 1B:
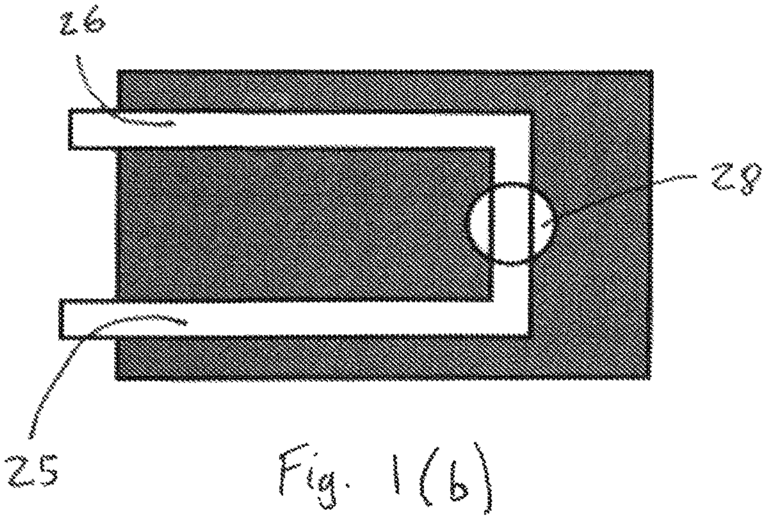
Fig. 1(b) Prior Art
Figure 1C:
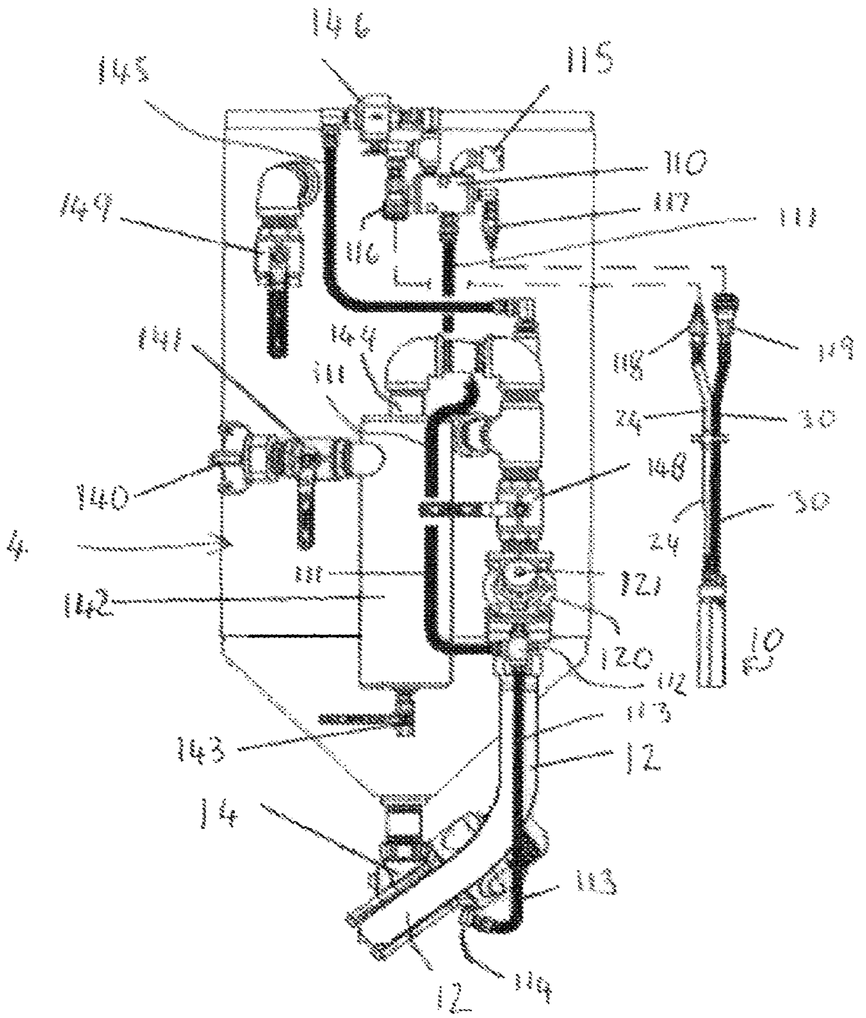
Fig 1(C) Prior Art

FIGS. 1(*a*) and 1(*b*), described above, represent schematically a previously used blasting apparatus including a previously used dead man control arrangement.

Figure 2A:
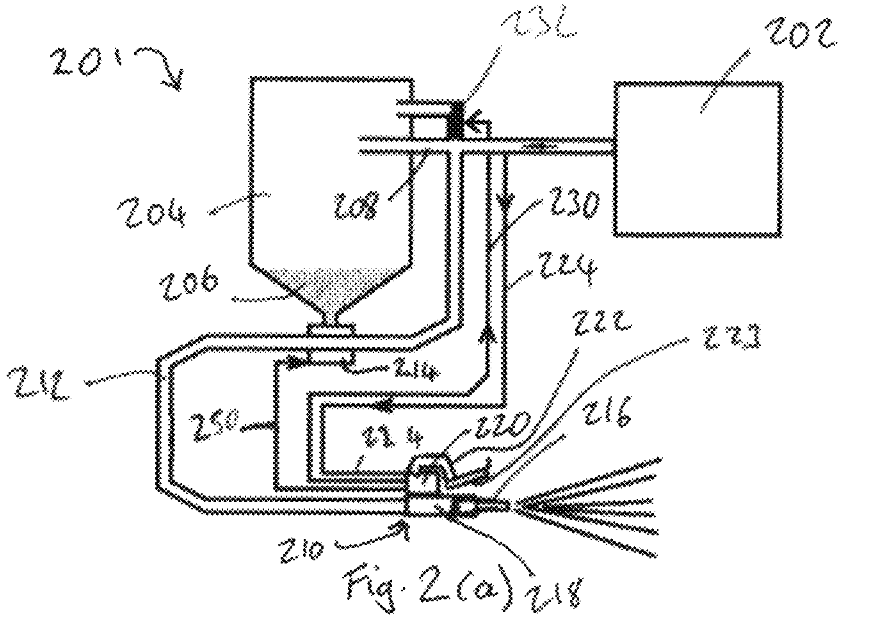
FIG. 2(*a*) is a schematic representation of an embodiment of a blasting apparatus including an embodiment of a dead man control arrangement in accordance with the present disclosure.
Figure 2B:
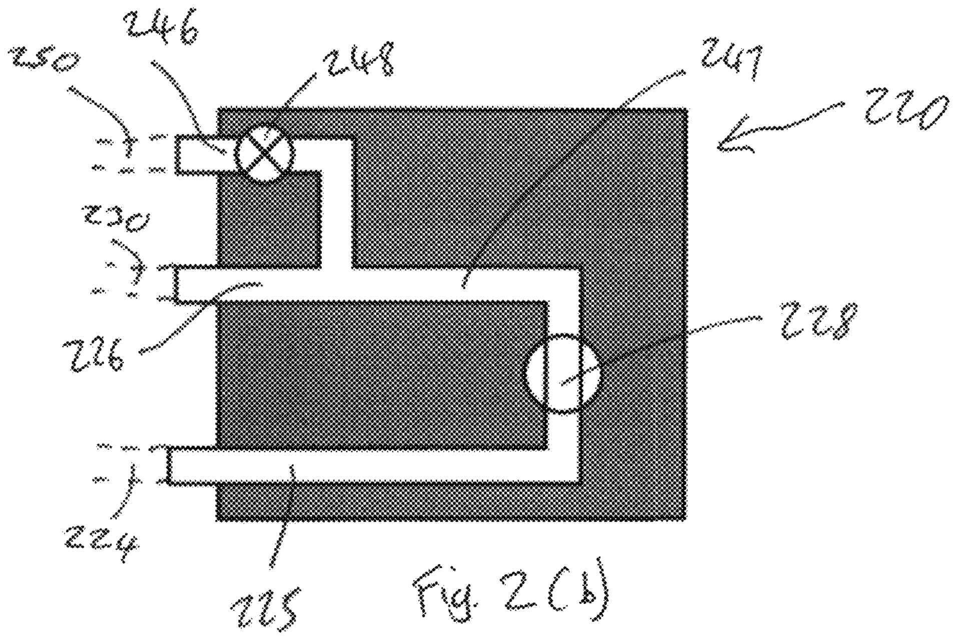
Figure 2C:
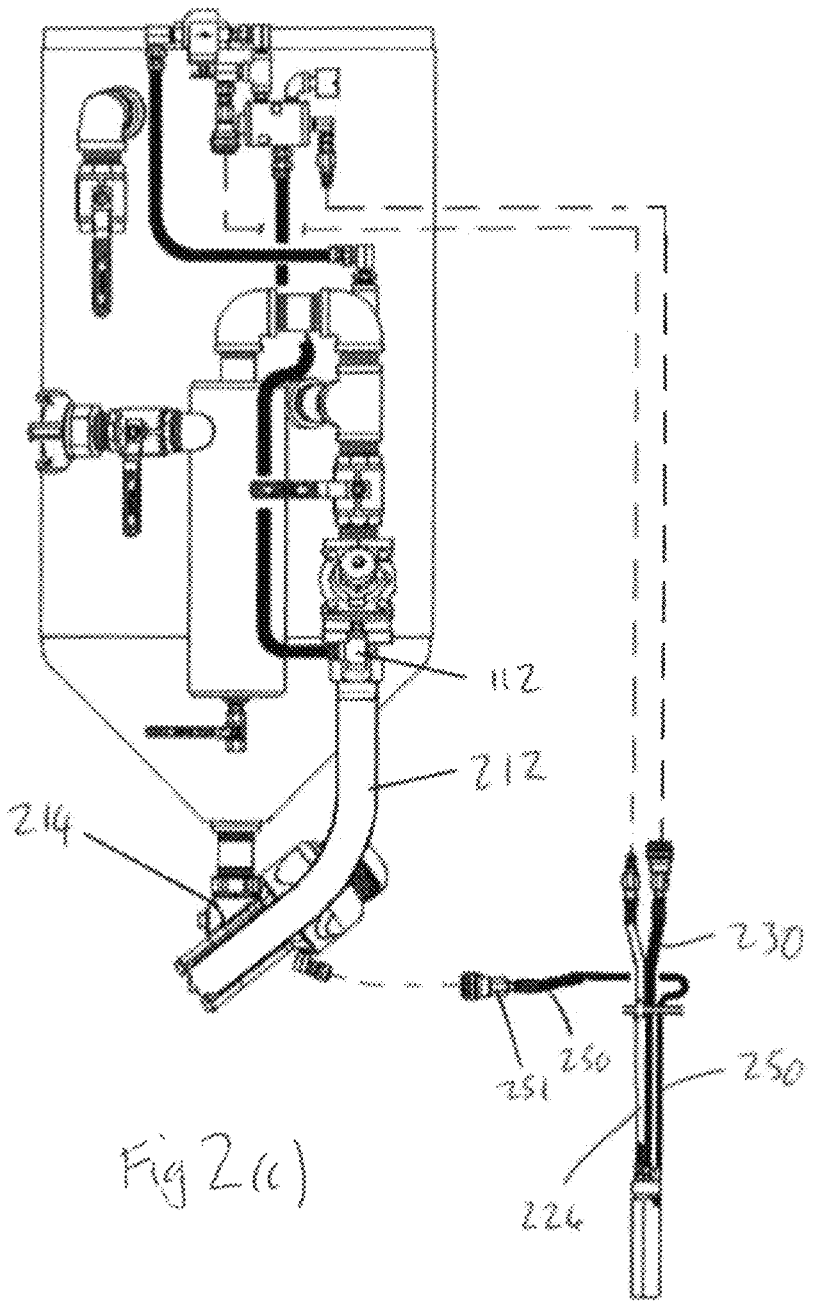

FIGS. 2(*a*) and 2(*b*) represent schematically, and in the same style as FIGS. 1(*a*) and 1(*b*), an embodiment of blasting apparatus including an embodiment of a dead man control arrangement in accordance with at least one aspect of the present disclosure.

A blasting control arrangement including a dead man control is schematically illustrated in FIG. 2(*a*) which schematically illustrates an abrasive blasting apparatus, generally designated 201. It will be appreciated that there are many similarities between the blasting apparatus 201 and the blasting apparatus 1.

The blasting apparatus 201 comprises a compressor 202 for supplying pressurised gas, in the form of compressed air and a blast pot 204 which contains an abrasive material 206, such as sand or particulate garnet. The compressor 202 is connected to the blast pot 204 by a suitable pneumatic hose 208, and is also connected to a nozzle arrangement 210 by a blast hose 212. In use, the blast pot 204 is pressurised by the compressor 202 as is the blast hose 212, allowing the abrasive material 206 to be gravity fed into the blast hose 212, via a metering valve 214, so that it is entrained into the air flow in the blast hose 212 and fed to the nozzle arrangement 210.

The nozzle arrangement 210 comprises a blast nozzle 216 connected to a nozzle holder 218, which is generally tubular and provides a passageway, for the air and abrasive, from the blast hose 212 to the blast nozzle 216. Attached to nozzle holder 218 is a valve body 220, and a control lever 222. An air supply line 224 provides a supply of pressurised air (provided by the compressor 202) to the valve body 220.

The valve body 220, illustrated schematically in FIG. 2(*b*), comprises an air inlet passage 225 connected to the air supply line 224, a first air outlet passage 226, a second air outlet passage 246 and a control valve 228. The first air outlet passage 226 and the second air outlet passage 246 may both be regarded as being connected to, and (selectively) supplied by, a main air outlet passage 247.

In its normal state control valve 228 is closed and prevents passage of air from the air inlet passage 225 to the main air outlet passage 247, thus also preventing passage of air to the first air outlet passage 226 and second air outlet passage 246.

The first air outlet passage 226 is connected to a first air return line 230, which is connected to a remote valve arrangement 232, close to the blast pot 204. The remote valve arrangement 232 controls flow of compressed air from the compressor 202 to the blast hose 212, and is configured to prevent flow of compressed air into the blast hose 212 unless activated by positive air pressure from the first air return line 230. Thus when the control valve 228 is closed (which is its normal condition) flow of air into the blast hose 212, and thus flow of air (and entrained abrasive) from the blast nozzle 216 is prevented, and operation of the blasting apparatus 201 is prevented.

The second air outlet passage 246 is connected to a second air return line 250, which is connected to the metering valve 214. The metering valve 214 controls flow of abrasive from the blast pot 204 into to the blast hose 212, and is configured to prevent flow of abrasive 206 into the blast hose 212 unless activated by positive air pressure from the second air return line 250. Thus when the control valve 228 is closed (which is its normal condition) flow of abrasive 206 into the blast hose 212 is prevented.

The control valve 228 can be opened, to allow flow of air from the air inlet passage 225 to the main air outlet passage 247. Air that passes through the control valve 228 can flow from the main air outlet passage 247 to the first air outlet passage 226 and second air outlet passage 246. In the illustrated embodiment the control valve 228 can be opened by a user squeezing a handle part 223 of the control lever 222 onto the blast nozzle 216, as will be described further in due course.

The second air outlet passage 246 has a selector 248 therein, allowing selection of whether or not air from the main air outlet passage 247 can pass through the second air outlet passage 246 to the second air return line 250. The selector 248 may be a manually operable flow control, as will be described further in due course.

It will be appreciated that when the control valve 228 is open, increased air pressure in the first return line 230 causes the remote valve arrangement 232 to allow air to from the compressor 202 to the blast hose 212. Under these conditions, if the selector 248 is configured by a user to allow air from the main air outlet passage 247 to pass through the second air outlet passage 246 to the second air return line 250, then abrasive will be entrained in the air stream, and abrasive blasting can be performed. If the selector 248 is configured by a user not to allow air from the main air outlet passage 247 to pass through the second air outlet passage 246 to the second air return line 250, then the metering valve 214 does not receive the positive pressure from the second air return line 250, and therefore prevents flow of abrasive 206 into high pressure air stream passing through the blast hose 212 to the nozzle 216. Thus the provision of the second air outlet passage 246, second air return line 250 and selector 248, allows a user operating the nozzle arrangement to control whether abrasive will be entrained in the air stream. It has been observed that users of abrasive blasting apparatus frequently wish to use a flow of high pressure air from the blast nozzle, for example to clean of abrasive from a work piece, and the described arrangement facilitates this.

It will be appreciated that the dead man control of the blasting apparatus 201 applies to both the abrasive and to the high pressure air flow, maintaining the safety aspects of the arrangement in the blasting apparatus 1 of FIGS. 1(*a*) and 1(*b*). The control lever 222 returns to a non-operating position if released by the user, and when this occurs the control valve 228 closes, thus preventing flow of air to the outlet passage 226, the air return line 230 and the remote valve arrangement 232, and thus effectively and rapidly stopping operation of the blasting apparatus 201.

The valve body 220, control valve 228, control lever 222, air supply line 224, air return lines 230, 250, remote valve arrangement 232 and metering valve 214 thus together provide a dead man control for the abrasive blasting apparatus 201. It will be appreciated that the described arrangement is designed to be reasonably failsafe, in that positive air pressure from the dead man control (effectively a positive return signal) is required in order for the blasting apparatus to operated, so that blockage, rupturing or disconnection of the air supply line 224 and/or air return lines 230, 250 will prevent, rather than allow, operation of the blasting apparatus 1.

It will further be appreciated that the use of air pressure in the first and second air return lines 230, 250 is effectively use of a pneumatic control signal to control, respectively, operation of the remote valve arrangement 232 and the by the metering valve 214. Although use of a pneumatic control signal is convenient under certain circumstances, there are circumstances where an electrical signal is preferred. For example, if the working distance between the nozzle arrangement 210 and the compressor 202 and/or blasting pot 204 is large (for example greater than about forty metres) the substantially instantaneous transmission of an electrical signal through a wire is considered preferable over the slower transmission of pneumatic pressure signals within a hose such as the air return lines 230, 250 in order to ensure rapid shut-off of the high pressure air from the blasting hose 212. It will be appreciated that use of electrical control signals can be implemented in a manner analogous to the described use of pneumatic signals, with current flow substituted for air flow, with wires or other suitable electrically conductive transmission pathways or parts substituted for the air passageways 225, 247, 226, 246, and suitable electrical switches substituted for the control valve 228 and selector 248. It will be appreciated that the valve body 220 is therefore an example of a body which, in other embodiments and in particular electrical embodiments may not include valves, so that it may be considered more generally to be a control body, or a body for locating various control components. This also applies to the valve bodies of other embodiments, including those described below.

While FIG. 1(*a*), represents the overall system somewhat schematically and in somewhat simplified form, practical implementations include additional elements. FIG. 1(*c*) illustrates a particular implementation of a system of the general type illustrated schematically in FIG. 1(*a*).

As illustrated in FIG. 1(*c*) the part referred to generally in relation to FIG. 1(*a*) as a remote valve arrangement 32 comprises several parts, including a pneumatic control valve 110 which is connected to the air supply line 24 and the air return line 30, and an automatic air valve 130 which directly controls supply of pressurised air to the blast hose 12. The pneumatic control valve 110 controls operation of the automatic air valve 120, via a first valve control air line 111, in response to detection of the presence or absence of air pressure in the air return line 30. The first valve control air line 111 is further connected via a junction 112 to a second valve control air line 113, which is, in turn connected to a control inlet 114 of metering valve 14. Metering valve 14, as illustrated in FIG. 1(*c*) is controlled by the presence or absence of pressure in the second valve control air line 113. Thus when no signal (high air pressure) is present in the air return line 30, both the automatic air valve 120 and the metering valve 14 close, respectively shutting off supply of air to the blast hose and supply of abrasive (and any associated pressurised air from the blast pot 4) to the blast hose. The metering valve 14, operable only in response to a positive signal, is a commercially available metering valve.

As further illustrated in FIG. 1(*c*), the apparatus provides a quick connect connector 140 for connection to the compressor, and an air inlet valve 141 for manually controlling flow of air from the compressor. When the air inlet valve 141 is open air flows from the compressor to a moisture separator 142, which has a drain valve 143. The air outlet 144 of the moisture separator 142 is connected to a main inlet of the pneumatic control valve 110 by an air line 145, via an inline strainer 146.

The outlet 144 of the moisture separator 142 is also connected to the blast hose 12 via a choke valve 148, and the automatic air valve 120.

The pneumatic control valve 110 is provided with a dust eliminator 115, and quick connect couplings 116, 117, for connection to complementary quick connect couplings 118, 119 of the air supply line 24 and the air return line 30, respectively.

The automatic air valve 120 is provided with a breather vent 121.

The blast pot 4 is further provided with a blowdown ball valve 149.

FIG. 2(*c*) illustrates implementation, in a system similar to that of FIG. 1(*c*), of the embodiment of FIGS. 2(*a*) and 2(*b*).

It will be appreciated that the blast pot and compressor end of the system requires little modification to utilise the presence or absence of pressure in the second air return line 250 to allow the metering valve 214 (which may actually be the same metering valve as the metering valve 14 of FIG. 1(*c*)) to allow or prevent flow of abrasive 206 into high pressure air stream passing through the blast hose 212 to the nozzle 216 and thereby allow a user operating the nozzle arrangement to control whether abrasive will be entrained in the air stream expelled from the nozzle.

The second air return line 250 is arranged to provide a positive signal (high air pressure) to the metering valve 214 to allow flow of abrasive 206 into high pressure air stream passing through the blast hose 212, or, as described above, in response to corresponding operation of the selector 248 does not provide the signal, so that flow of abrasive 206 is prevented. As illustrated in FIG. 2(*c*), this may be achieved by connecting the second air return line 250 to the control inlet 114 of metering valve 214 (which may be the same metering valve, and the same inlet as the metering valve 14 of FIG. 1(*c*)). A suitable quick coupling 251 may be provided on the second air return line 250. It will be appreciated that in the illustrated embodiment of FIG. 2(*c*) the second valve control air line 113, present in FIG. 1(*c*) has been removed, and a corresponding closing off of the outlet of junction 112 may be required, although this may occur automatically upon disconnection of couplings used, depending on type. As the other parts illustrated in FIG. 1(*c*) remain unchanged, they will not be again described.

It will be appreciated that this is not the only way in which presence or absence of a signal in the second air return line 250 may be used to control the metering valve—in one alternative the second air return line may be connected to the (or a) pneumatic control valve 110, which in turn provides a corresponding signal to the metering valve.

Figure 3:
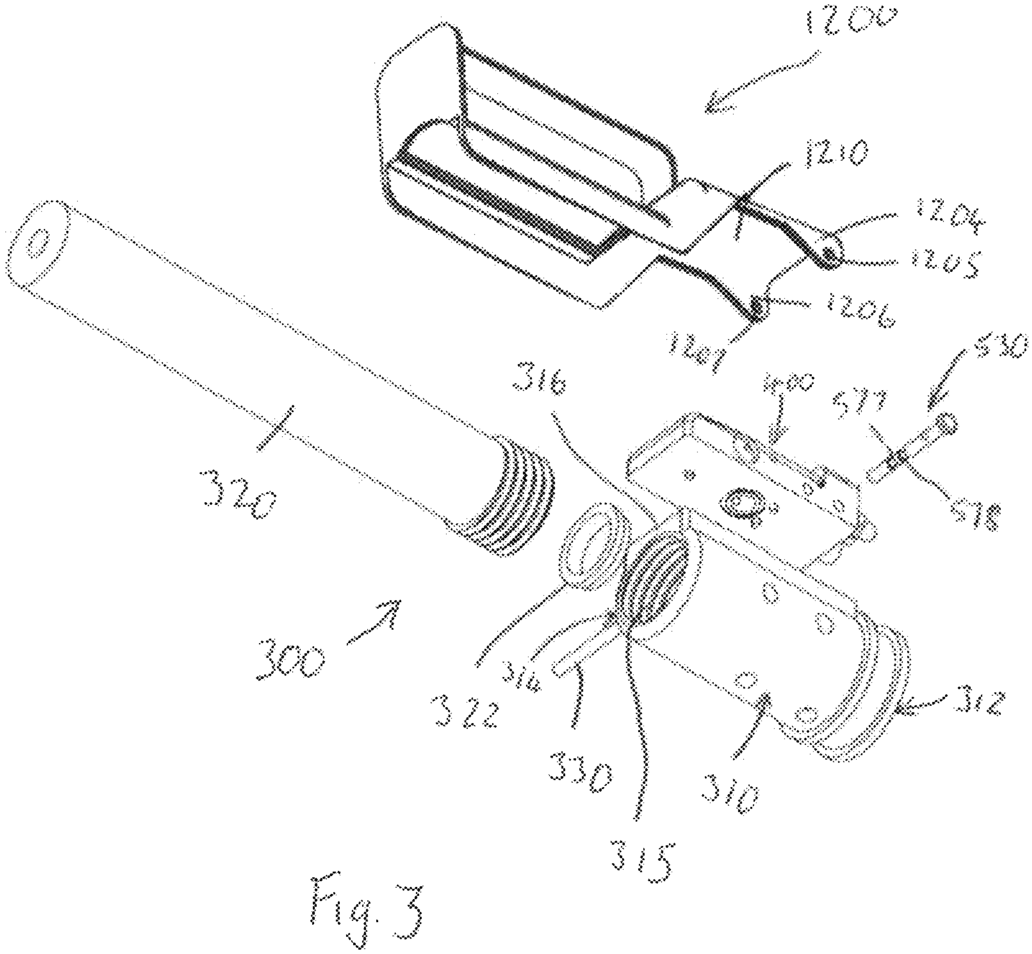
FIG. 3 is a schematic exploded perspective representation of a nozzle arrangement of a blasting apparatus, including some of the main components of an embodiment of a dead man control arrangement in accordance with the present disclosure.

FIG. 3 shows an embodiment of a nozzle arrangement in accordance with the present disclosure, generally designated 300, which is a particular embodiment of the more generally described nozzle arrangement 210 of apparatus 201.

The nozzle arrangement 300 comprises a generally cylindrical, generally tubular nozzle holder 310, a blasting nozzle 320, and a nozzle washer 322, which in use assists in maintaining a pressurised connection between the blast hose and the blasting nozzle 320. The nozzle holder 310 has a downstream first end 312 which provides a connection configuration 313 (for example internal thread shown in FIG. 8) for coupling to a complementary coupling of a blasting hose, and a second end 314, with a female screw thread 315, for attachment to the blasting nozzle 320. The nozzle holder 310 is provided with a receiving surface 316 for receiving a valve body 400 (shown in more detail in, for example, FIG. 4) which is an embodiment of schematically presented valve body 220 of FIG. 2(*a*).

The nozzle arrangement 300 further comprises a control lever 1200 (shown in more detail in, for example, FIGS. 12 and 13) which is an embodiment of schematically presented control lever 222 of FIG. 2(*a*), a pivot pin 330 for pivotably attaching the control lever 1200 to the valve body 400, and a selector component 530 which extends into the valve body 400 and acts as an embodiment of selector 248 of FIG. 2(*b*), as will be described with reference to, for example, FIG. 5.

Figure 4:
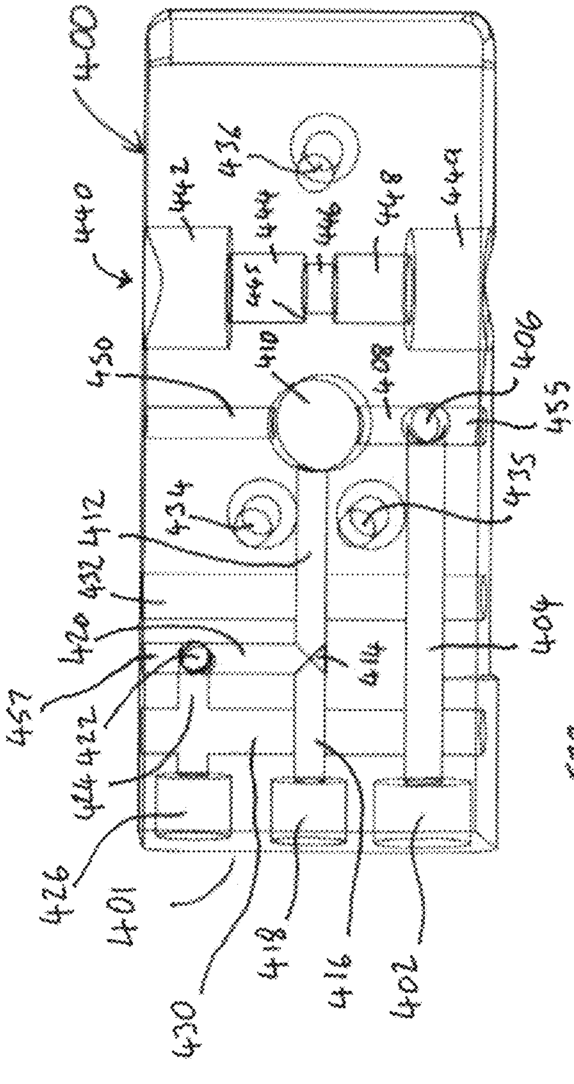
FIG. 4 is a schematic plan view representation of a valve block of an embodiment of a dead man control arrangement in accordance with the present disclosure illustrating passageways and cavities of the valve block.

The valve body 400 is comprises a block of material, such as a suitable metal or polymer material, in which various cavities and passageways are provided. For clarity, FIG. 4 shows the valve body 400 and the cavities and passageways therein, absent any associated components, and most of the components which are attached to the valve body 400 are illustrated in appropriate relative positions, but absent the valve body 400, in FIG. 5. FIG. 6 shows the components and valve body 400 together, and is effectively a superposition of FIGS. 4 and 5.

With reference to FIG. 4, the valve body 400 has a first end 401 in which is provided an air inlet 402, which in use is connected to an air supply such as that provided by air supply line 224 of FIG. 2(*a*). Connected to the air inlet 402 is a main air inlet passage 404 which extends away from the first end 401 of the valve body 400, in a direction which is substantially parallel, in use, to a main longitudinal axis of the nozzle holder 310, and which may be referred to as the length direction of the valve body 400. The substantially perpendicular direction corresponding generally to the transverse or radial direction of the nozzle holder 310 may be referred to, for ease of reference, as the depth direction of the valve body 400.

The main air inlet passage 404 provides a depth extension part 406 approximately half way along the length of the valve body 400, which extends deeper into the valve body 400, and which is in fluid connection with a control valve inlet passage 408. The control valve inlet passage 408 opens into a deeper part of a control valve chamber 410. The main valve chamber 410 is generally cylindrical with an axis extending in the depth direction of the valve body, and is open at the top (least deep) surface of the valve body 400. However, it will be appreciated that the main valve chamber 410 might not be absolutely cylindrical, as it is configured to interact with a control valve member (described below) in order to allow passage of air when the control valve is in an open configuration. It should also be appreciated that, as described later in detail in relation to the embodiment of FIGS. 14 to 24, the main valve chamber 410 may be open at the bottom (deepest) surface of the valve body 400, to provide an automatic cut-off, by allowing escape or venting of air, if the valve body 400 is detached from the nozzle holder 310.

The control valve chamber 410 is in fluid connection with a control valve outlet passage 412 which extends from the control valve chamber 410 substantially parallel with, and at substantially the same depth as, the main air inlet passage 404.

The control valve outlet passage 412 branches at a passage junction 414 into a first air return passage 416 and a first part 420 of a second air return passage 420, 424. The first air return passage 416 terminates, substantially at the first end 401 of the valve body 400, at a first air outlet 418. The first air return passage 416 and first air outlet 418 correspond generally to the first air outlet passage 226 of FIG. 2(*b*), so that in use, the first air outlet 418 may be regarded as a control signal outlet for control of the high pressure gas supply to the nozzle arrangement 300.

The first part 420 of the second air return passage 420, 424 is provided with a depth extension part 422 which extends deeper into the valve body 400, and is connected to a second part 424 of the second air return passage 420, 424, which extends in the length direction of the valve body to terminate substantially at the first end 401 of the valve body 400, at a second air outlet 426. The second air return passage 420, 424 and second air outlet 426 correspond generally to the second air outlet passage 246 of FIG. 2(*b*), so that in use, the second air outlet 426 may be regarded as a control signal outlet for control of the metering valve, and control of the supply of abrasive to the nozzle arrangement 300.

The second part 424 of the second air return passage 420, 424 is intersected by a selector component receiving passage 430. The selector component receiving passage 430 extends the full width of the valve body 400, but is deeper than the main inlet passage 404 and first air return passage 416, so that it does not connect with either of these passages. Although not shown in FIG. 4, some or all of the selector component receiving passage 430 may be non-circular (for example square) in transverse cross section, so that a complementary shaped selector component (to be described in due course) is able to slide therein, but not rotate about the axis of the selector component receiving passage 430.

The valve body 400 further provides a hinge pin receiving passage 432, which extends the full width of the valve body 400, and crosses, but is deeper than, the main inlet passage 404 and control valve outlet passage 412, so that it does not connect with either of these passages.

The valve body 400 further provides first, second and third fastener holes 434, 435, 436, which extend the entire depth of the hinge body 400, and in use receive fasteners, such as screws, used to fasten the valve body to the nozzle holder 310.

The valve body 400 further provides a cross bore 440, for receiving a safety catch arrangement for preventing inadvertent movement of the control lever 1200 from the non-operating position to the operating position. In the illustrated embodiment the cross bore 400 comprises a first side wider bore part 442, at one side of the valve body, a first side narrower bore part 444, just laterally inwards from the first side wider bore part 442. The cross bore 400 further comprises a laterally central narrowest bore part 446, a second side wider bore part 449, at the side of the valve body opposite the first side wider bore part 442, and a second side narrower bore part 448, between the laterally central narrowest bore part 446 and the second side wider bore part 449. All the bore parts are substantially cylindrical in transverse cross section, and substantially mutually coaxial.

The valve body 400 further provides a valve retainer bore 450 leading to the control valve chamber 410 from a side of the valve body 400.

The valve body 400 further provides a first bore portion 455 leading from the control valve inlet passage 408 to a side of the valve body, which is present due to the control valve inlet passage 408 being made by drilling into the valve body 400 from the side thereof. The first bore portion serves no purpose other than allowing access of a drill bit to interior of the valve body to enable drilling of the control valve inlet passage 408. The valve body further provides a similarly redundant second bore portion 457, which extends from the first part 420 of the second air return passage 420, 424 to a lateral side of the valve body 400, and a similarly redundant third bore portion 459, shown in FIG. 7, which extends from the depth extension part 422 of the second air return passage 420, 424 to the top (least deep) surface of the valve body 400. The valve body 400 further provides a similarly redundant fourth bore portion 461, shown in FIG. 7, which extends from the depth extension part 406 of the air inlet passage 404 to the top (least deep) surface of the valve body 400. The second, third and fourth bore portions 457, 459, 461 are artefacts of drilling the first part 420 of the second air return passage 420, 424 the depth extension part 422 of the second air return passage 420, 424, and the depth extension part 406 of the air inlet passage 404, respectively, from the side and top of the valve body.

Figure 7:
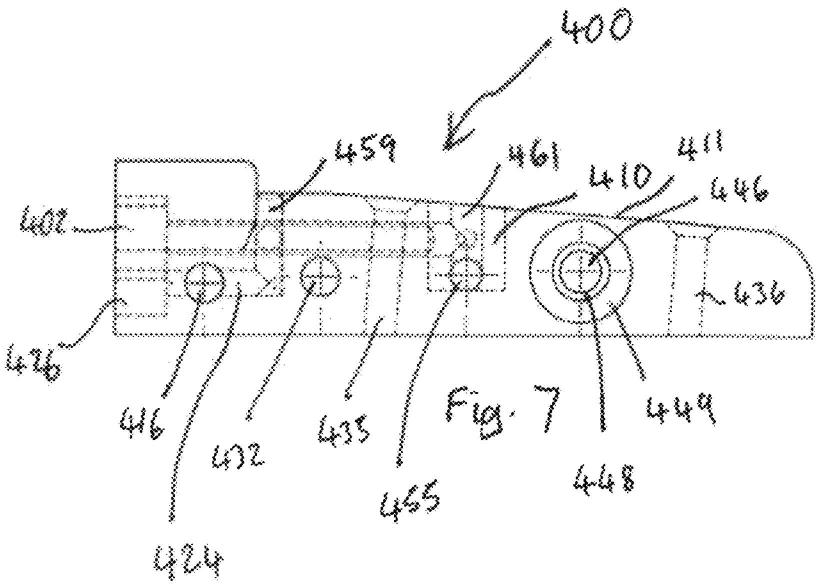
FIG. 7 is a schematic side view representation of the valve block of FIG. 4, further illustrating passageways and cavities thereof.

As can be seen best in FIG. 7, the valve body 400 is slightly tapered in depth or thickness, having a gradually reducing thickness as the valve block extends away from the first end 401. The gradually reducing thickness, or taper, begins at approximately the longitudinal point of the valve body where the hinge pin receiving passage 432 is provided, and thus provides, in use, a top surface 411 (meaning the surface, which is in use furthest from the provides receiving surface 316 and/or furthest from the longitudinal axis of the nozzle holder 310 and nozzle 320) which slopes slightly towards the longitudinal axis of the nozzle holder 310 and nozzle 320, in the direction corresponding to the position of the nozzle 320 relative to the nozzle holder.

Figure 5:
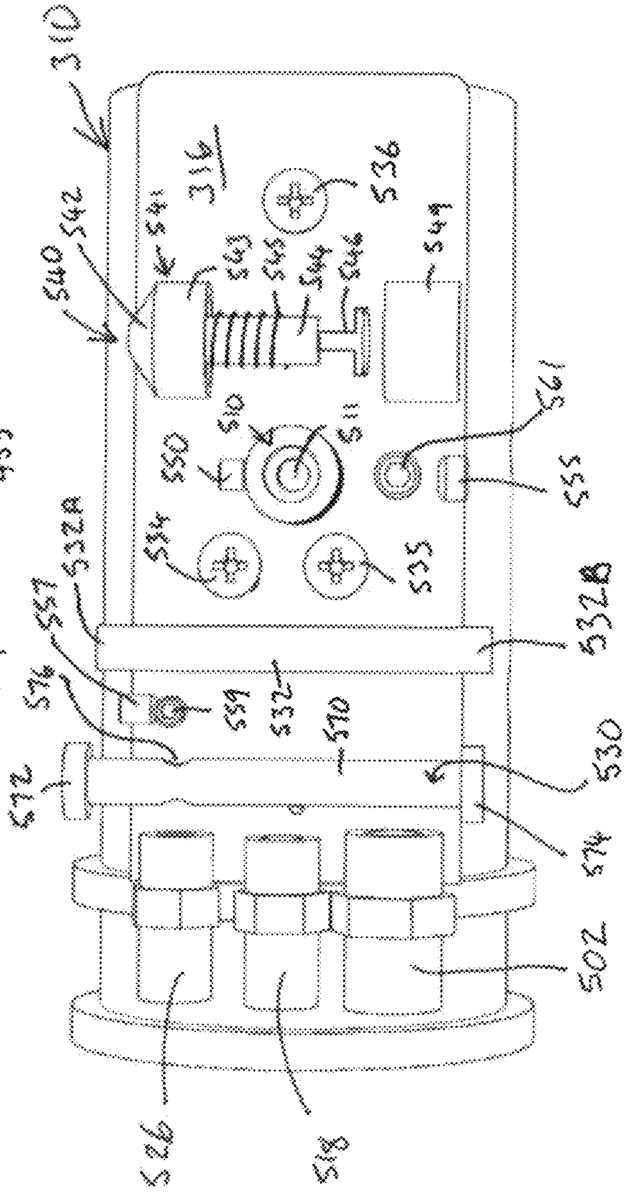
FIG. 5 is a schematic plan view representation of components used in association with the valve block, positioned as in use with the valve block, but with the valve block omitted for clarity.
Figure 6:
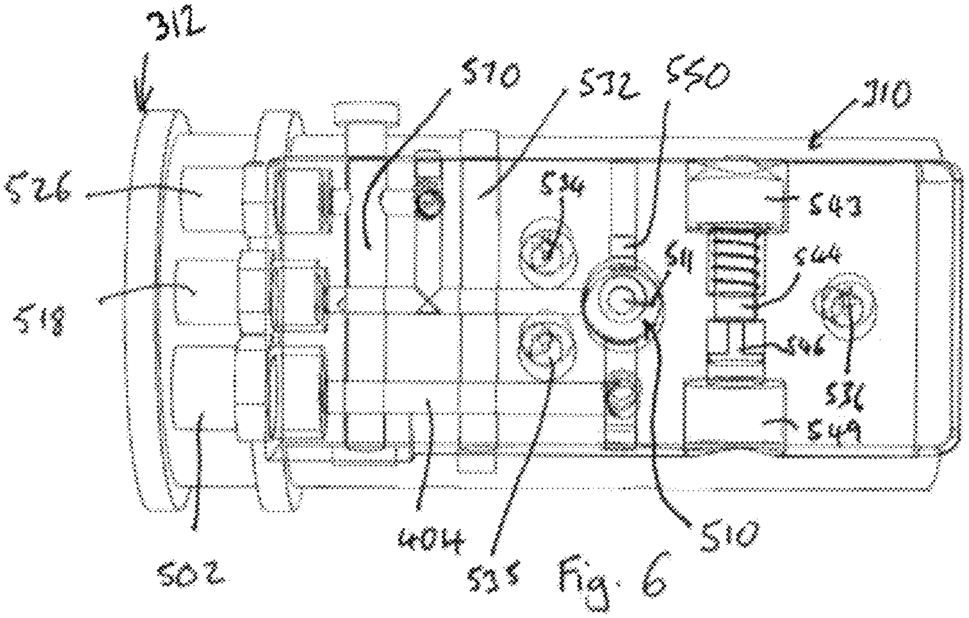
FIG. 6 is a representation of the valve block of FIG. 4 with the components of FIG. 5 positioned relative to the valve block.
Figure 8:
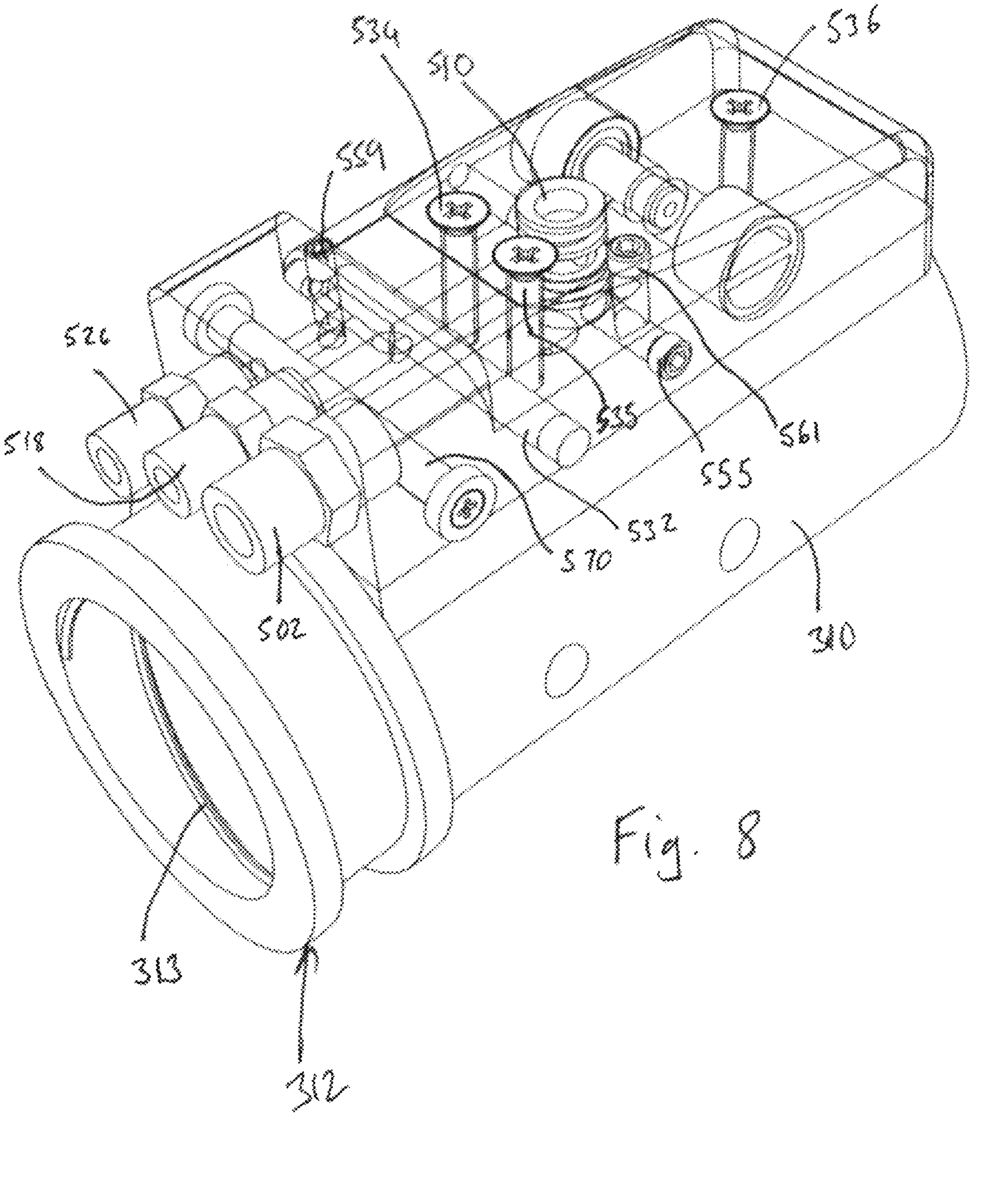
FIG. 8 is a schematic first perspective view of the valve block of FIG. 4 with the components of FIG. 5 positioned relative to the valve block.
Figure 9:
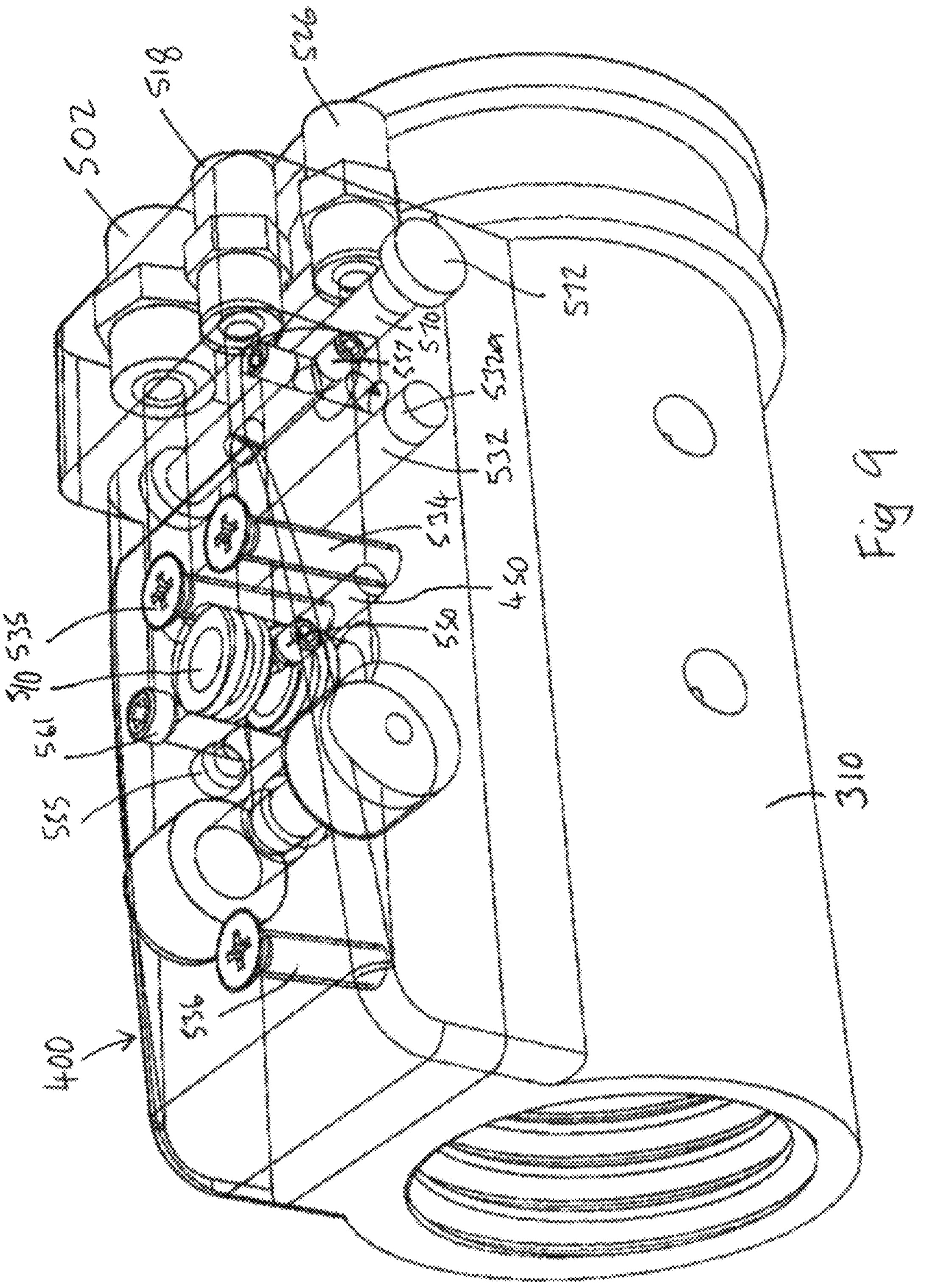
FIG. 9 is a schematic second perspective view of the valve block of FIG. 4 with the components of FIG. 5 positioned relative to the valve block.

With particular reference to FIGS. 5 and 6, and also FIGS. 8 and 9, the components associated with and/or connected to the valve body 400 (with the exception of the control lever 1200) and which form part of the nozzle arrangement 300, and/or dead man control, will now be described. FIG. 5 shows the components without the valve body 400, and FIGS. 6, 8 and 9 shows the components in position relative to the valve body 400.

The nozzle holder 310 underlies the valve body 400 in use, and provides receiving surface 316 to which the valve body 400 is attached in use. The valve body 400 is fastened to the nozzle holder 310 by first second and third threaded fasteners 534, 535, 536, (for example Allen screws or cross headed screws, as illustrated) which in use extend through the first, second and third fastener holes 434, 435, 436 and into complementary holes (1034, 1035, 1036 shown in FIG. 10) in the receiving surface 316 of the nozzle holder 310.

As shown in FIG. 5, an air inlet fitting 502, which may be a generally tubular metal connector, is provided for fitting into the air inlet 402, and enabling connection of the air inlet 402 to an air supply line, such as air supply line 224 shown schematically in FIG. 2(*a*). A first air outlet fitting 518, which may be a generally tubular metal connector, is provided for fitting into the first air outlet 418, and enabling connection of the first air outlet 418 to a first air return line, such as a first air return line 230 of FIG. 2(*a*). A second air outlet fitting 526, which may be a generally tubular metal connector, is provided for fitting into the second air outlet 426, and enabling connection of the second air outlet 426 to a second air return line, such as a second air return line 250 of FIG. 2(*a*). The outlet fittings 502, 518, 526 may be screwed into the respective inlet 402 and outlets 418, 426 utilising complementary screw threads (not shown).

A selector component 530 is provided, and in use is received in, and retained in, the selector component receiving passage 430. The purpose of the selector component 530 is to allow a user to selectively block, or allow air flow though, the second part 424 of the second air return passage 420, 424, thereby selectively preventing or allowing a positive pneumatic signal to be provided to second air outlet 426. In the embodiment illustrated schematically in FIGS. 2(*a*) and 2(*b*), this is to selectively prevent or allow a control signal to be sent to the metering valve 214, to prevent or allow dispensing of abrasive into blast hose 212.

In the illustrated embodiment the selector component 530 comprises an elongate body 570 which is slidable in its longitudinal direction in the selector component receiving passage 430, and the movement of which is constrained to a short distance within the selector component receiving passage 430 by widened end parts 572, 574 just outside each end of the component receiving passage 430 which cannot enter the component receiving passage 430. The elongate body 570 has a transversely extending hole or fluid passageway 576. The fluid passageway 576 is arranged so that when the elongate body 570 is at one extreme of its range of movement (as illustrated best in FIG. 6) the fluid passageway 576 extends between and connects the two parts of the second part 424 of the second air return passage 420, 424 which are separated by the component receiving passage 430 thus allowing passage of air. When the elongate body 570 is at the other extreme of its range of movement, the fluid passageway 576 is displaced (along the selector component receiving passage 430), so that air flow between the two parts of the second part 424 of the second air return passage 420, 424 is blocked by the physical presence of the elongate body 570.

As illustrated schematically in FIG. 3, the elongate body 570, may be provided with first and second axially spaced grooves or recesses 577, 578, spaced apart by a distance substantially corresponding to the distance between the two extremes of the range of movement of the selector component 530, and each adapted to interact with a detente or catch mechanism provided in the valve body 400, which extends into the selector component receiving passage 430 to engage with one or other of the grooves or recesses 577, 578. The engagement of the detente or catch mechanism is engineered to be sufficiently secure to prevent inadvertent movement of the selector component 530 away from a position selected by a user, but to allow a user to deliberately move the selector component 530 in order to allow or prevent air flow between the two parts of the second part 424 of the second air return passage 420, 424.

Movement of the selector component 530 by a user thus allows the user to selectively block, or allow air flow to second air outlet 426. Of course (as will be appreciated from, for example, consideration of FIG. 2(*b*) and the associated description) there will be no air flow to the second air outlet 426 if the control valve is not in its open position. It should also be appreciated that other mechanisms, effectively control switches, for selectively allowing or preventing air flow through the second air return passage 420, 424 are possible, and that in the event that an electrical, rather than pneumatic arrangement is used the selector may be a manually operable electrical or electronic switch.

The assembly further comprises plugs 557, 559, which in use are located in, and seal, the second and third bore portions 457, 459.

The assembly further comprises a hinge pin 532, which in use is received in the hinge pin receiving passage 432, and which has first and second ends 532A, 532B which protrude from respective sides of the valve body, and to which the control lever 1200 is mounted in use.

The assembly further comprises plugs 555, 561, which in use are located in, and seal, the first and fourth bore portions 455, 461.

The assembly further comprises a control valve body 510, which in use is located in the control valve chamber 410, and which provides a valve body end 511 which is depressible by the control lever 1200 being in an operating position. The control valve body 510 is retained in the control valve chamber 410 by a control valve retainer 550, which may be a grub screw or the like, which is in use located in the valve retainer bore 450.

The control valve body 510 and control valve chamber 410 interact to provide a control valve of a type which may be of any suitable type known per se in pneumatic dead man controls of abrasive blasting apparatus, and its structure and function will not be described in detail. However, it will be appreciated that in the illustrated embodiment the control valve body 510 is normally, in use, maintained in a valve-closed, less deep, position by pressure of air from the control valve inlet passage 408 (corresponding to the valve body end 511 being is a non-depressed, less deep, position) so that air is not able to be transmitted from the control valve inlet passage 408 to the control valve outlet passage 412, and that movement of the control lever 1200 to the operating position depresses the valve body end 511 and moves the control valve body 510 to a deeper position, opening the control valve and allowing air to be transmitted from the control valve inlet passage 408 to the control valve outlet passage 412. (The structure and operation of such control valves of pneumatic dead man control arrangements is known, per se, in the art and by way of example, a control valve with suitable structure and function is used in the model G2 pneumatic deadman of Axxiom Manufacturing, of Texas, USA, and is sometimes referred to as a Schmidt valve, AXXIOM and SCHIVIIDT both being trade marks.)

The assembly further comprises a safety catch arrangement 540 the components of which are located in cross bore 440 in use. The components comprise a detente member 541 having a frustoconical surface 542 at an end thereof, a generally cylindrical body part 543 of the same diameter as the widest part of the frustoconical surface 542. The diameter of the generally cylindrical body part 543 is very slightly smaller than the diameter of the first side wider bore part 442 of the cross bore 440. Projecting from the generally cylindrical body part 543, at the opposite end thereof to the frustoconical surface 542 is a relatively small diameter stem or shaft 544, sized to be able to project into laterally central narrowest bore part 446 of the cross bore 400. A helical spring 545 is retained about the shaft 544. In use the cylindrical body part 543 is received in the first side wider bore part 442 of the cross bore 440, and the shaft extends into the laterally central narrowest bore part 446. The spring 545 provides an outward bias force (by being constrained and slightly compressed between the cylindrical body part 543 and an annular, inner, outwardly facing wall 445 of the cross bore 440 provided where the first side narrower bore part 444 transitions into the laterally central narrowest bore part 446. A screw 546, with its head constrained on the distal side of the laterally central narrowest bore part 446, and its shaft connected to the end of the shaft 544, retains the detente member against completely exiting the cross bore 440. A plug member 549 is received in the 449 (through which, during assembly, a tool may be inserted to tighten the screw 546) to conceal and/or protect the screw 546.

When the control lever 1200 is in the non-operating position the cylindrical body part 543 is in an extended position, projecting from the cross bore 440, and obstructs the control lever from being moved into the operating position unless the detente member 541 is pushed by a user into the cross bore 440, against the bias force provided by the spring 545. When the control lever 1200 is in the operating position, the detent member is retained in the cross bore 440, in a retracted position, by engagement of part of the control lever 1200 with the end of the frustoconical surface 542. If the control lever 1200 is moved (or released by the user so that it moves) to the non-operating position, the detent member moves, under the bias force of the spring 545, back into the extended position, and must again be moved into the retracted position by a user to allow the control lever 1200 to be moved into the operating position. The détente member 541 is shown in the retracted position in the drawings.

Figure 10:
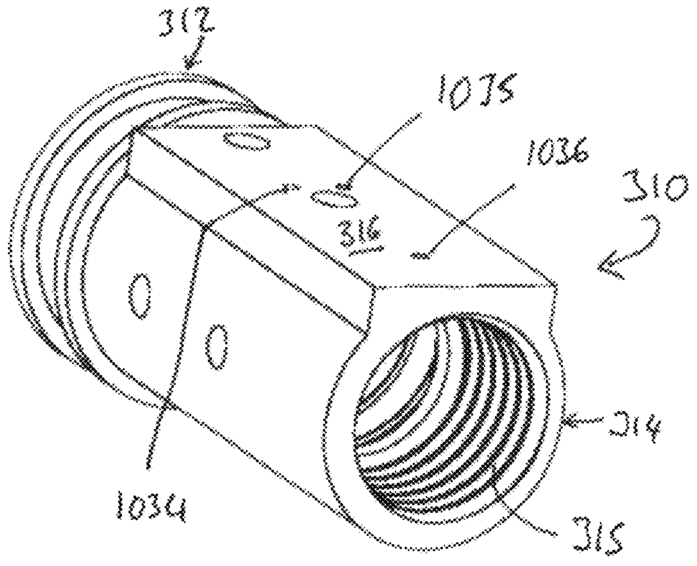
FIG. 10 is a perspective view of an embodiment of a nozzle holder which is part of the nozzle arrangement of FIG. 3 and is also shown in FIGS. 5, 8 and 9.
Figure 11:
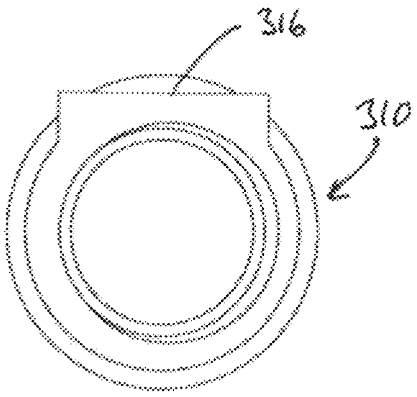
FIG. 11 is an end view of the nozzle holder of FIG. 10.

FIGS. 10 and 11 show the nozzle holder 310 in isolation.

Figure 12:
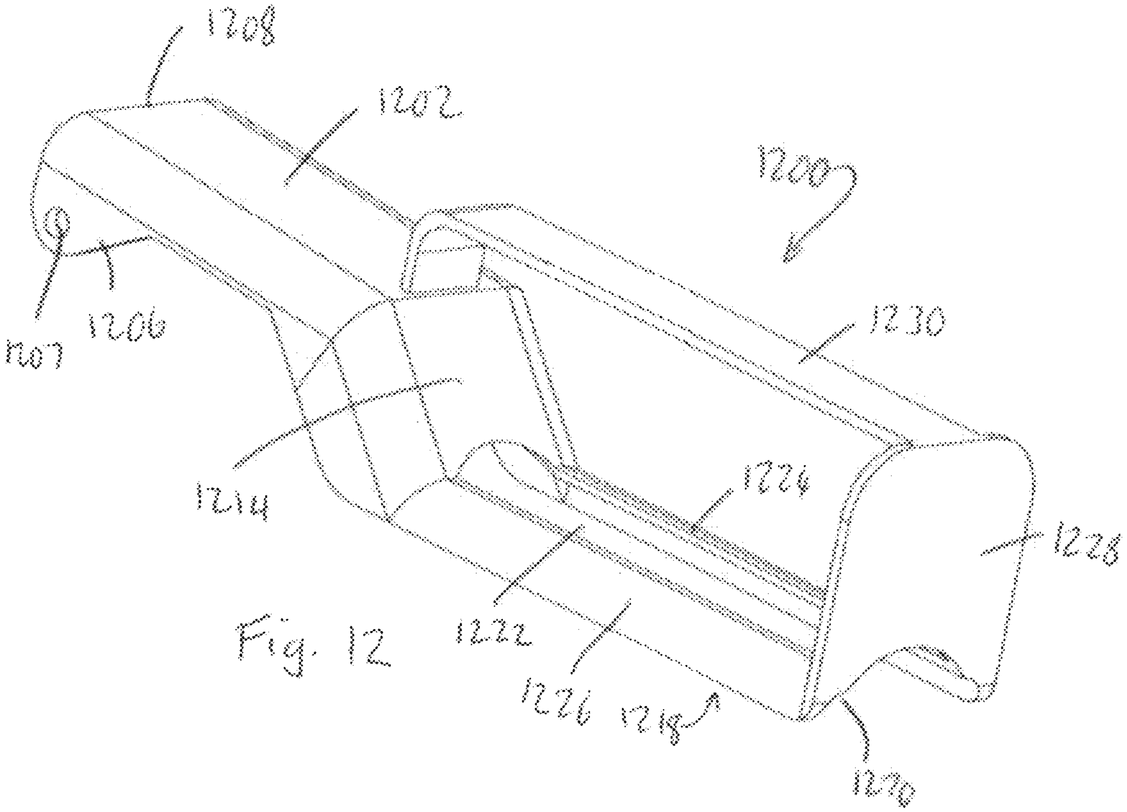
FIG. 12 is a perspective view of an embodiment of a control lever which is part of the nozzle arrangement of FIG. 3.
Figure 13:
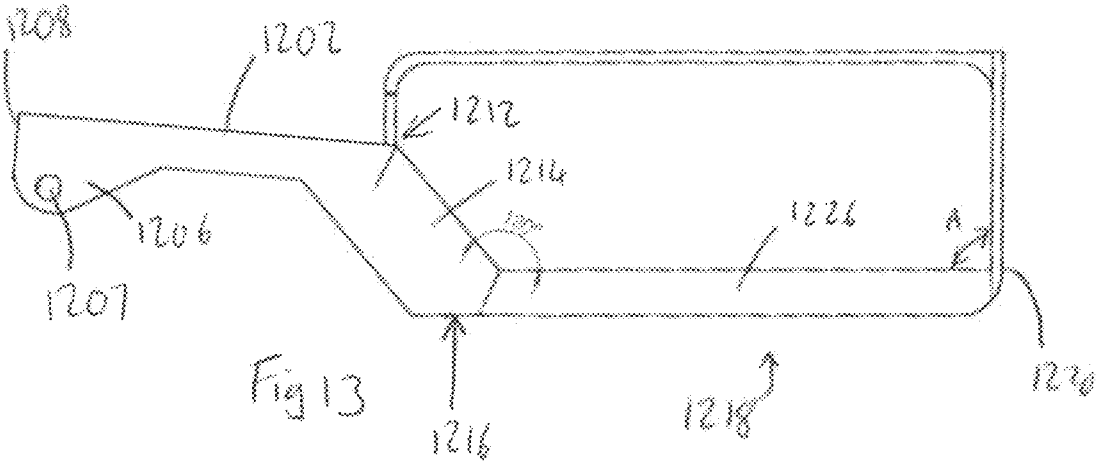
FIG. 13 is a side view of the control lever of FIG. 12.

FIGS. 12 and 13 show an embodiment of a control lever 1200, which is part of the embodiment of FIG. 3, parts of which are illustrated in FIGS. 4 to 11.

The control lever 1200 comprises an actuating part being an actuating plate 1202 for overlying the valve body 400, having first- and second-side connection parts 1204, 1206, depending at or adjacent a first end 1208 thereof. Each of the first- and second-side connection parts 1204, 1206 is provided with a respective aperture 1205, 1207 for engaging respective, first and second ends 532A, 532B of the hinge pin 532, for allowing the control lever 1200 to pivot relative to the valve body 400. An underside 1210 (shown in FIG. 3) of the actuating plate 1202 is able to bear upon the valve body end 511 of the control valve member 510 to open the control valve when the control lever 1200 is held in the operating position.

At the second end 1212 of the actuating plate 1202 there is provided a transition part 1214 of the control lever 1200, which extends from the actuating plate 1202 towards the nozzle 320 at an angle of approximately 45 degrees. The end of the transition part 1214 distal from the actuating plate 1202 connects to a first end 1216 of a handle part 1218 of the control lever 1200. The handle part 1218 of the control lever 1200 in use extends from the transition part 1214 generally in the same direction as the nozzle 320 extends from the nozzle holder 310, but is arranged so that in the non-operating position the first end 1216 of the handle part 1218 is closer to the nozzle 320, and a second end 1220 of the handle part is further from the nozzle 320. That is, in the non-operating position the handle part 1218 diverges away from the nozzle 320 as it extends away from the transition part 1214 and the valve body 400. Thus the handle part 1218 diverges away from the nozzle 320 at an angle. In the illustrated embodiment 1200 the angle is about five degrees, although different angles, for example about 2 degrees to about 20 degrees, could be used in alternative embodiments.

In the illustrated embodiment 1200, this is achieved by having the control lever 1200 configured so that in the non-operating position the actuating plate 1202 is substantially parallel to the axis of the nozzle 320 and nozzle holder 310, and so that the handle part 1218 is not parallel to the actuating plate 1202, but rather is inclined relative to the actuating plate 1202 at the desired angle (about five degrees in the illustrated embodiment). In the particular embodiment illustrated in FIGS. 3, 12 and 13, the transition part 1214 extends from the actuating plate 1202 towards the nozzle 320 at an angle of approximately 45 degrees, and the handle part 1218 extends from the transition part at an angle of approximately 130 degrees. Of course, alternative configurations to provide the handle part 1218 at an angle to the axis of the nozzle 320 are possible.

The handle part 1218 provides a slot 1222 along its length into which a part of the nozzle 320 extends the when the control lever 1200 is in the operating position. Put another way, the of the handle part 1218 comprises first and second spaced apart limbs 1224, 1226, and a part of the nozzle extends into the space between the limbs 1224, 1226 when the control lever 1200 is in the operating position. The slot 1222 or spacing between the first and second limbs 1224, 1226 is preferably at least a quarter of the diameter of the nozzle, and more preferably between about a third and about two thirds of the diameter of the nozzle.

The handle part is provided at its second end 1220 with a hand-retaining member 1228, which prevents (or at least renders unlikely) the hand of a user inadvertently slipping off the second end 1220 of the handle part 1218. It will be appreciated that the hand of the user will typically be within a heavy protective glove, and may be somewhat fatigued from holding the handle in the operating position for a protracted period. Thus the hand-retaining member 1228 is dimensioned to provide a substantial barrier. In the illustrated embodiment the hand-retaining member 1228 extends at least 20 mm, preferably at least 30 mm and more preferably at least 50 mm in the direction perpendicular to the direction of elongation of the handle part 1218. Further, in the illustrated embodiment the hand-retaining member 1228 is angled by an internal angle A which is no more than about 150 degrees to handle part 1218, and is less than about 120 degrees, and about 90 degrees or less in the illustrated embodiments. The substantial extension of the hand retaining member, and angle of extension is provided, at least in the illustrated embodiments, so that a user need not rely substantially on friction due to tightly gripping the handle (and associated part of the nozzle) to prevent the handle part slipping through and out of the hand of the user due to thrust on the nozzle which occurs as a reaction to ejection of air (and, if applicable, abrasive) from the nozzle. Rather, the abutment of the hand retaining member 1228 with the gloved hand of the user resists such thrust. This can substantially reduce the gripping force required during operation, and thereby substantially mitigate fatigue and discomfort during use.

In the embodiment of FIGS. 12 and 13 the control lever 1200 is further provided with a second hand retaining member 1230 which is substantially parallel to, and spaced apart from the main part of the handle member 1218. In the illustrated embodiment the second hand retaining member 1230 extends from the hand retaining member 1228 to the actuating plate 1202. Thus the transition part 1214, handle part 1218, hand-retaining member 1228 and second hand retaining member 1230 together form a closed loop, reducing the likelihood of a user dropping the nozzle arrangement or otherwise having the operating hand becoming disengaged from the nozzle arrangement. As will be appreciated from consideration of FIGS. 14 to 18, the second hand retaining member 1230 may be omitted in some embodiments.

In use, the divergence of the handle part 1218 from the nozzle 320 in the non-operating position leads to the thrust of the nozzle in reaction to the expulsion of fluid and, possibly abrasive, therefrom, assisting the user in maintaining the control lever 1200 in the operating position. The provision of a slot 1222 in the handle part 1218, into which part of the nozzle extends when the control lever is in the operating position can reduce the effective diameter of the handle part 1218 and nozzle 320 together, which facilitates gripping by a user and reduces the potential for fatigue, compared to having to have the user's hand extend around a solid handle overlaid upon a nozzle. Further, the engagement of the handle part with the nozzle, rather than with the top of a structure (such as a valve block) of greater transverse size, can reduce the effective transverse size (e.g. diameter) of the part that must be gripped in order to operate the dead man control arrangement, which also facilitates gripping by a user and reduces the potential for fatigue. These benefits may become more clear and apparent upon consideration of FIGS. 16 and 17 which illustrate an alternative embodiment including similar configuration and benefits.

FIGS. 14 to 24 illustrate an alternative embodiment of a nozzle arrangement including a dead man control, with many similarities to the embodiment of FIGS. 3 to 13. The similarities should be apparent, so that only the differences will be described in detail. Parts corresponding to parts of the embodiment of FIGS. 3 to 13 may be designated by the same reference numerals and may not be mentioned in the description, or reference numerals may be omitted where correspondence of parts appears clear.

Figure 14:
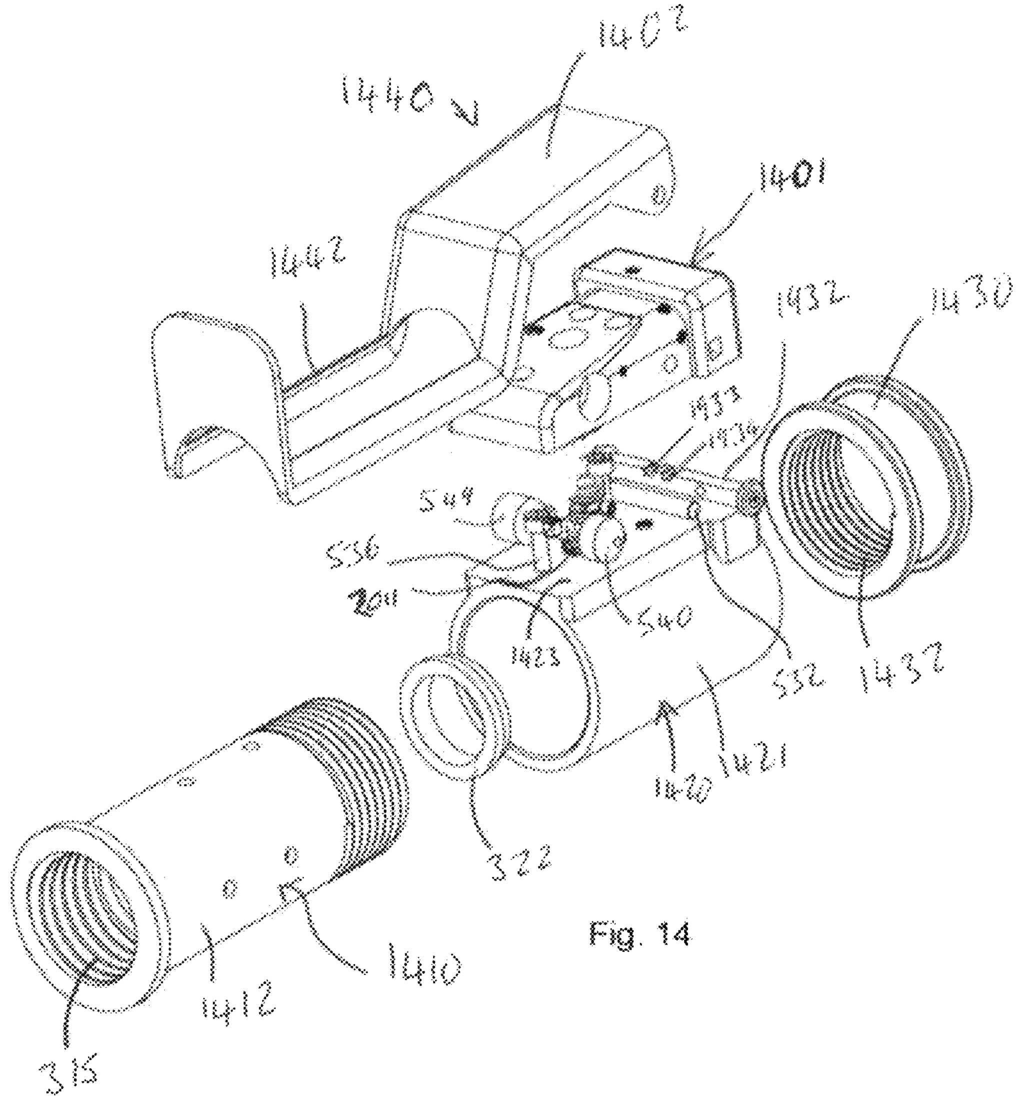
FIG. 14 is a perspective exploded view of an alternative embodiment of a nozzle arrangement including a dead man control in accordance with the present disclosure, with the nozzle omitted.

FIG. 14 is a schematic perspective exploded view of an alternative embodiment of a nozzle arrangement, generally designated 1400, including a dead man control in accordance with the present disclosure, with the nozzle omitted. As a nozzle may be added without difficulty, and may subsequently be removed and replaced with another nozzle, the arrangement 1400 is to be regarded as a 'nozzle arrangement' irrespective of whether the nozzle itself is actually attached.

The differences between the nozzle arrangement 1400 and the nozzle arrangement 300 of FIGS. 3 to 13 will now be described.

In the nozzle arrangement 300 of FIGS. 3 to 13, the valve body 400 is fixed directly to the nozzle holder 310 via receiving surface 316 provided on the nozzle holder 310, whereas in the nozzle arrangement 1400 of the valve body 400 is mounted on a sleeve 1480 which is mounted on, and rotatable relative to, the nozzle holder.

As illustrated in FIG. 14, a nozzle holder 1410 of the nozzle arrangement 1400 is provided with a generally cylindrical main body part 1412, which does not have a larger diameter part with a connection configuration for coupling to a complementary coupling of a blasting hose at the downstream end thereof, which allows a sleeve 1420 to be slid onto the nozzle holder 1410 during assembly. The sleeve 1420 is retained on the nozzle holder 1410 by a sleeve retainer 1430, which includes a connection configuration for coupling to a complementary coupling of a blasting hose. The nozzle holder 1410 and sleeve retainer 1430 are provided with complementary screw threaded parts 1414, 1432 to allow them to be connected together. The sleeve 1420 comprises a generally cylindrical body part 1421 with a generally cylindrical internal surface 1422 complementary to external cylindrical surface of the nozzle holder 1410, dimensioned to allow the sleeve 1420 to rotate relative to the nozzle holder 1410, in use. The sleeve 1420 further provides a region with a generally planar receiving surface 1423 for receiving a valve body 1401, which is very similar to valve body 400, except as described below.

Nozzle arrangement 1400 includes a control lever 1440, which is similar to control lever 1200, except that is it is more slender in overall shape and lacks the second hand retaining member 1230 of control lever 1200.

Figure 15:
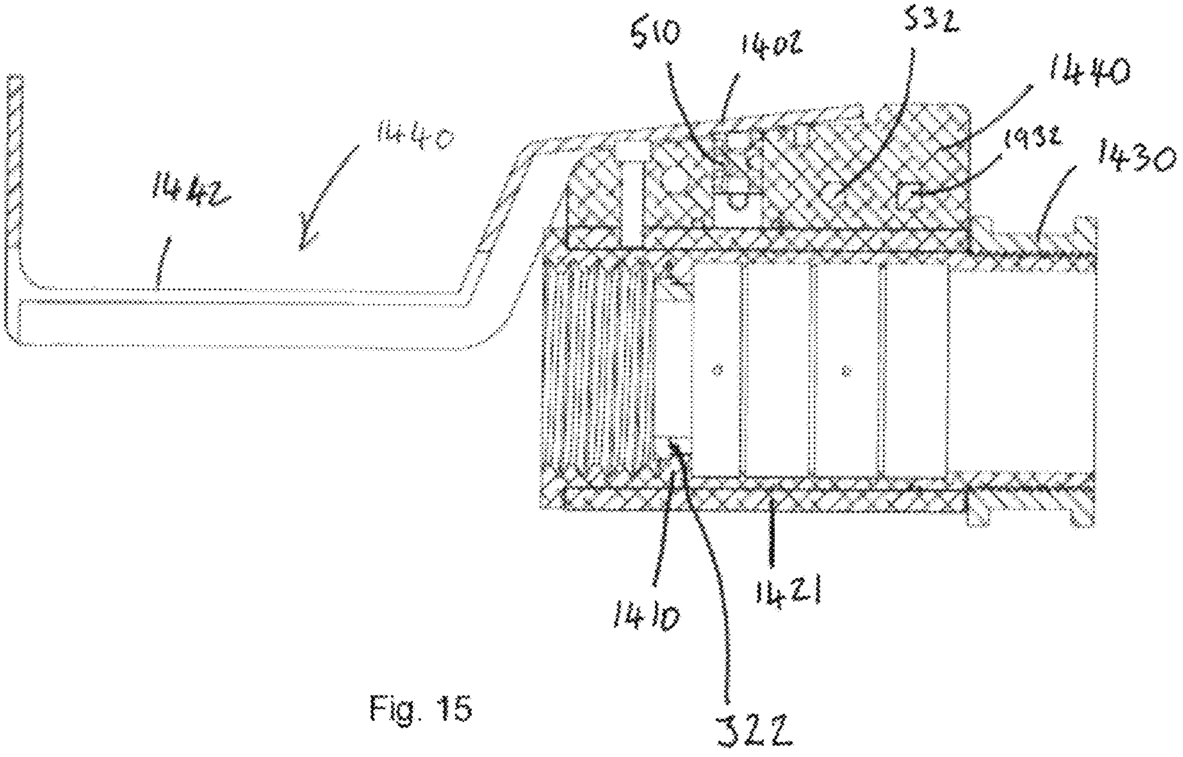
FIG. 15 is a schematic medial longitudinal cross sectional view of the embodiment of FIG. 14.

The assembled nozzle arrangement 1400 is illustrated in schematic longitudinal cross section in FIG. 15. FIG. 15 illustrates the operative position of the control lever 1440, in which an underside of actuating panel 1402 is depressing control valve body 510 and following the inclined top surface of the valve body 1401, and in which handle part 1442 of the control lever 1440 extends substantially parallel to the axis of the nozzle holder 1410.

Figure 16:
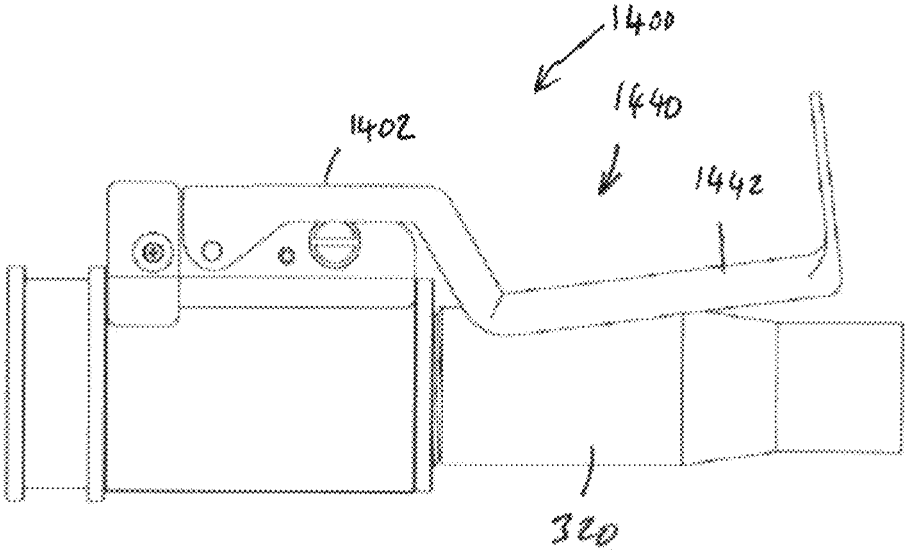
FIG. 16 is a side view of the embodiment of FIGS. 14 and 15, including a nozzle, showing a lever thereof in a non-operating position.

FIG. 16 is a side view of the assembled nozzle arrangement 1400 with the control lever 1440 in the non-operating position, illustrating the divergence of handle part 1442 of the control lever 1440 from the nozzle 320.

Figure 17:
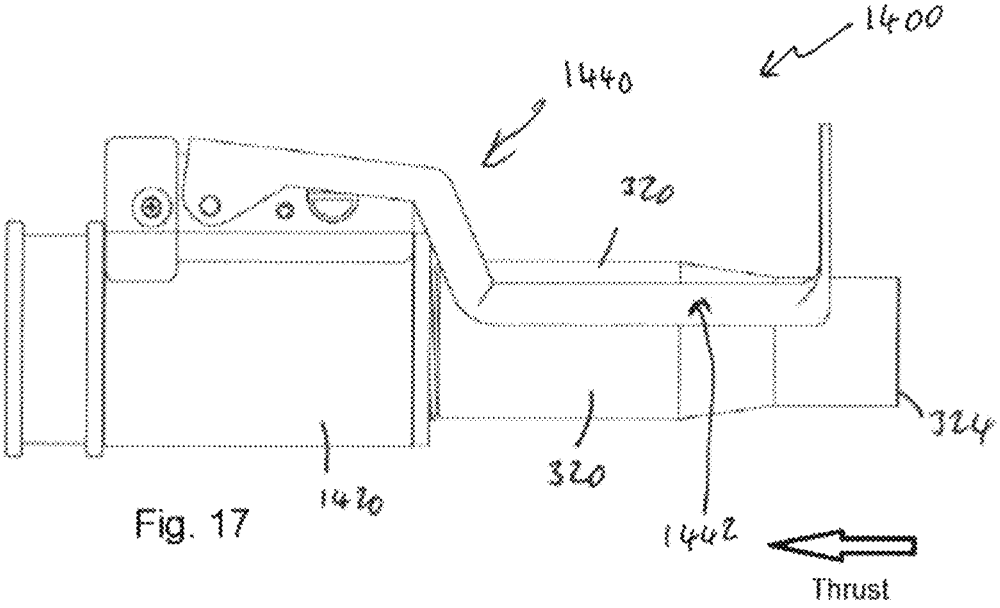
FIG. 17 is a side view corresponding to that of FIG. 16, but showing the lever in an operating position.
Figure 18:
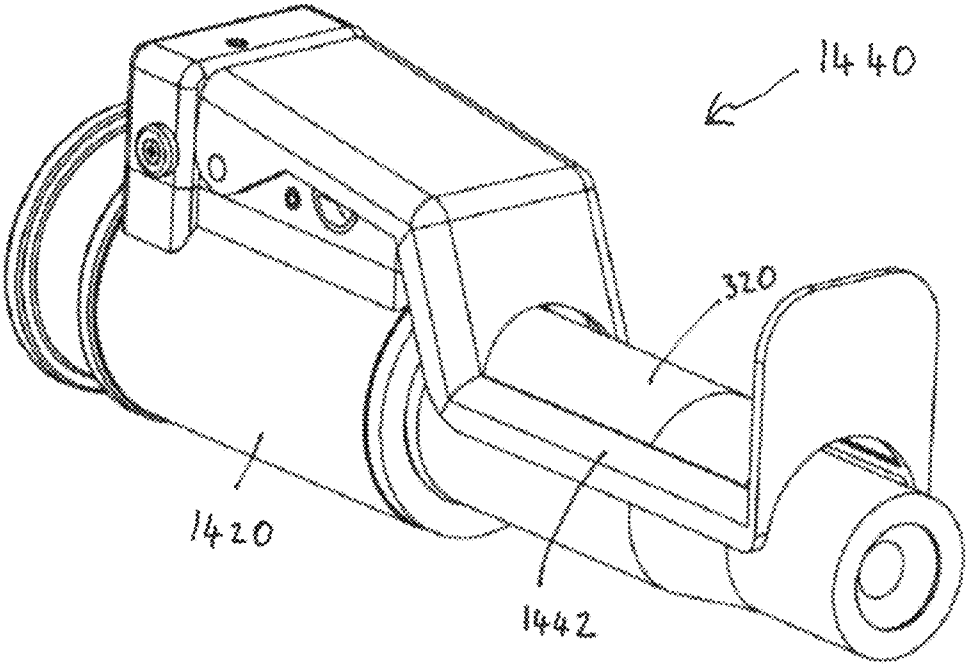
FIG. 18 is a perspective view corresponding to FIG. 17.

FIG. 17 is a side view of the assembled nozzle arrangement 1400 with the control lever 1440 in the operating position, illustrating the handle part 1442 of the control lever 1440 extending substantially parallel to the axis of the nozzle 320, and part of the nozzle 320 extending through the slot of the handle part 1442. FIG. 18 is a corresponding perspective view. It will be appreciated that the part of the nozzle 320 that extends through the slot of the handle part 1442, comprises a substantial part of the length of the nozzle 320, and in the illustrated embodiment more than half of the length of the nozzle part which is external to the nozzle holder 1420.

It will be appreciated that when air, and or air and abrasive, is expelled from the nozzle 320 (when the control lever is in the operating position, the nozzle experiences a reaction force in the direction opposite to the expulsion, as indicated by the arrow labelled with the word 'thrust' in FIG. 17. This reaction force or thrust is in a direction that would tend to force the nozzle arrangement back into the hand of a user and equivalently, is applied in a manner that may force the user's hand (relative to the nozzle arrangement 1400) towards the nozzle tip end 324. It will be appreciated that when a user's hand is holding the handle part 1442 in the operating position (as will, or should, be the case when air is being expelled from the nozzle 320) it will be gripping the handle part 1442 and nozzle 320, with the hand and fingers/thumb wrapped around both the handle part 1442 and the nozzle 320. The effect of the thrust, which effectively provides a force on the hand towards the nozzle tip end 324, is considered to actually enhance the grip of the user, and reduce the likelihood of user fatigue due to the generated thrust assisting in keeping the handle part in the operating position. Further, providing the handle part 1442 so that it is substantially parallel to the axis of the nozzle in the operating position is considered to have the effect that in the event that there is some slipping of the user's hand, upon the application of reaction thrust, the user need not tighten the grip in order to maintain good engagement with the handle part 1442 and nozzle, as would likely be required if the handle part were inclined towards the axis of the nozzle. It will be appreciated that corresponding functionality is also achieved by the nozzle arrangement 300.

FIGS. 19 to 24 are representations of the valve block 1401 of the nozzle arrangement 1400 of FIGS. 14 to 18, being a variation of the valve block of FIGS. 4 and 6 to 9, illustrating passageways and cavities thereof.

Figure 19:
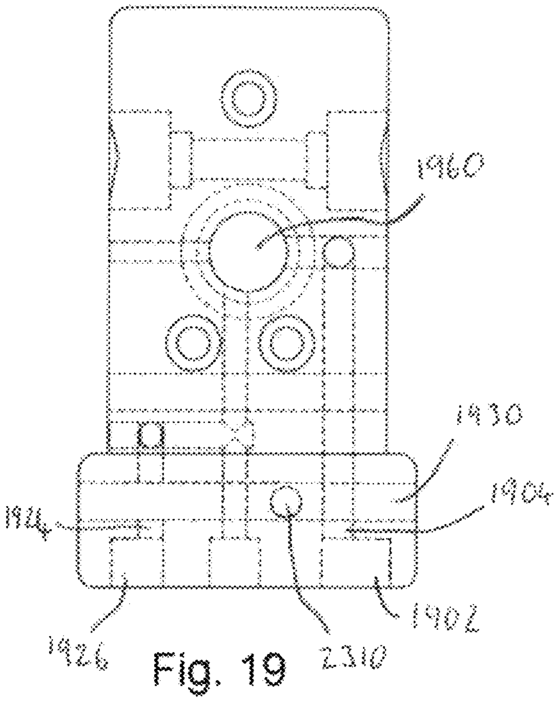
FIGS. 19 and 20 are respectively schematic plan and side view representations of the valve block of the embodiment of FIGS. 14 to 18, being a variation of the valve block of FIGS. 4 and 6 to 9, illustrating passageways and cavities thereof.
Figure 20:
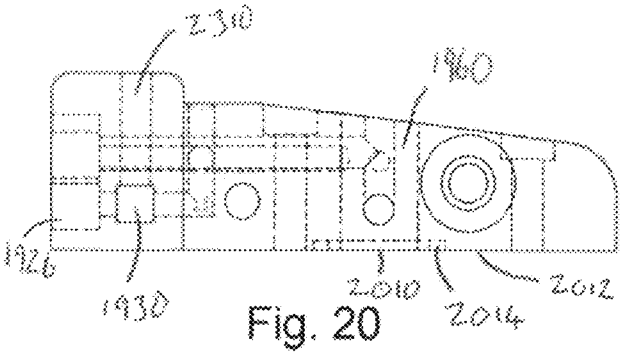
Figure 21:
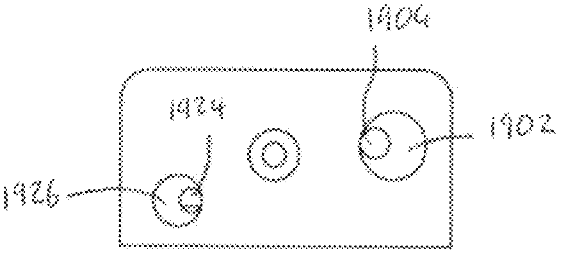
FIG. 21 is an elevation view, from a first end, of the valve block of FIGS. 19 and 20.
Figure 22:
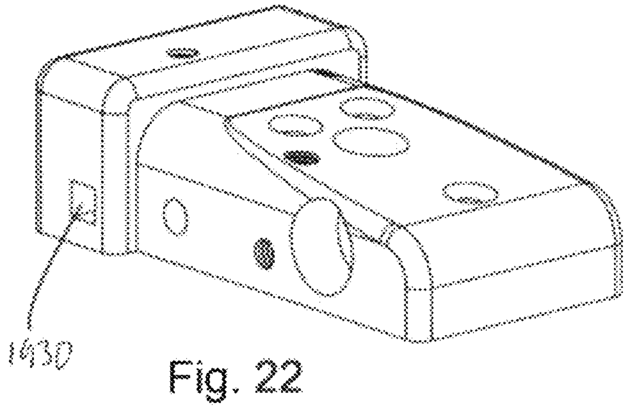
FIG. 22 is a perspective view, from a second end, of the valve block of FIGS. 19 to 21.
Figure 23A:
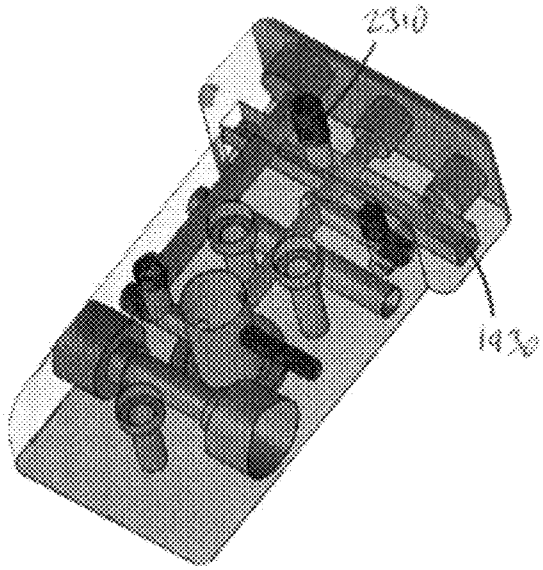
FIGS. 23(*a*) and 24(*a*) are respectively top and bottom schematic perspective views, showing internal detail, of the valve block of FIGS. 19 to 22, with surfaces of internal details rendered as shaded surfaces.
Figure 23:
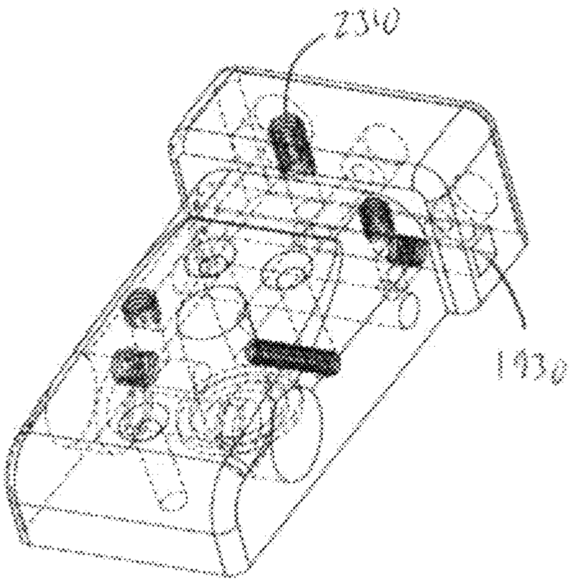
Figure 24A:
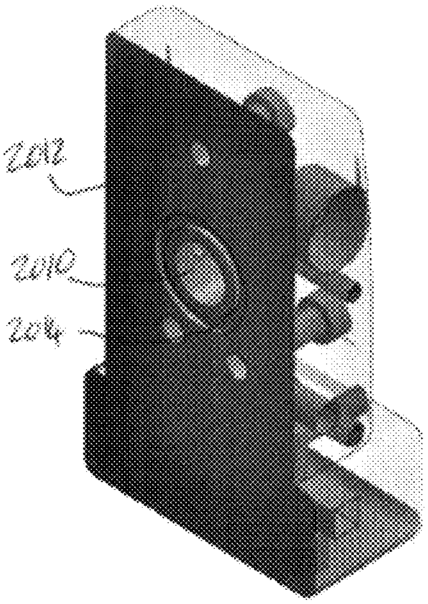
Figure 24B:
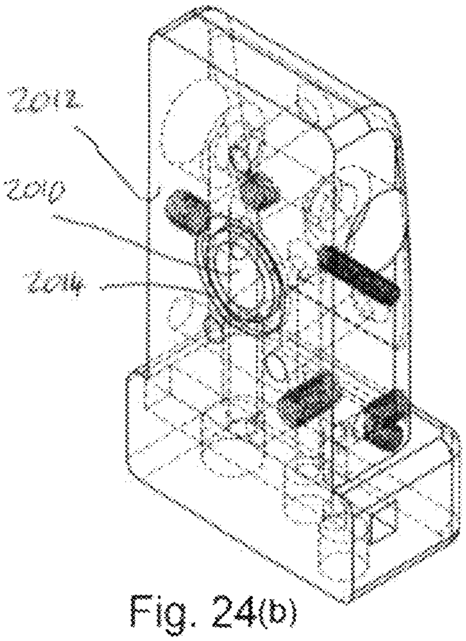
Figure 25:
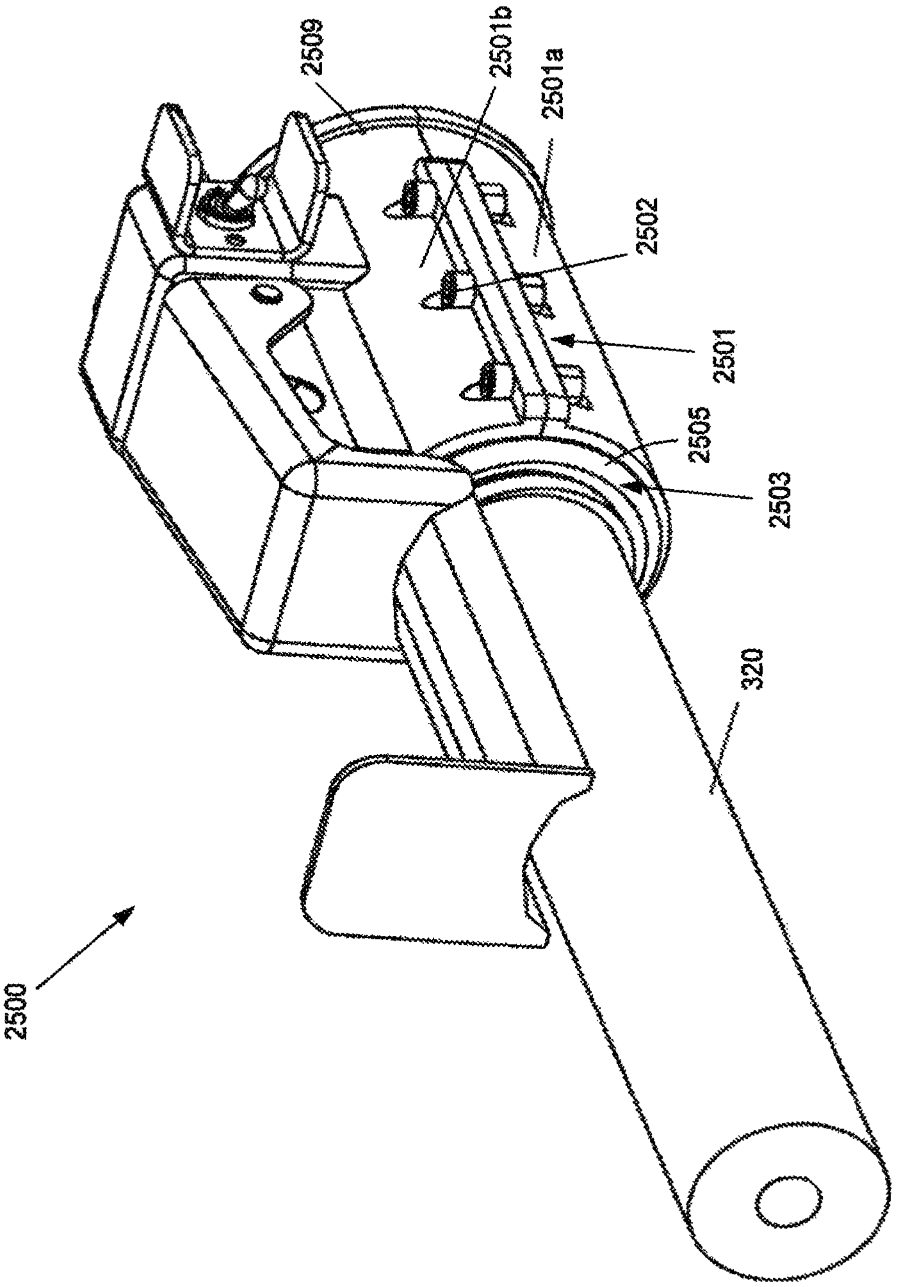
FIG. 25 depicts a nozzle arrangement of a blasting apparatus, including some of the main components of an embodiment of a dead man control arrangement in accordance with an embodiment of the present disclosure.
Figure 26:
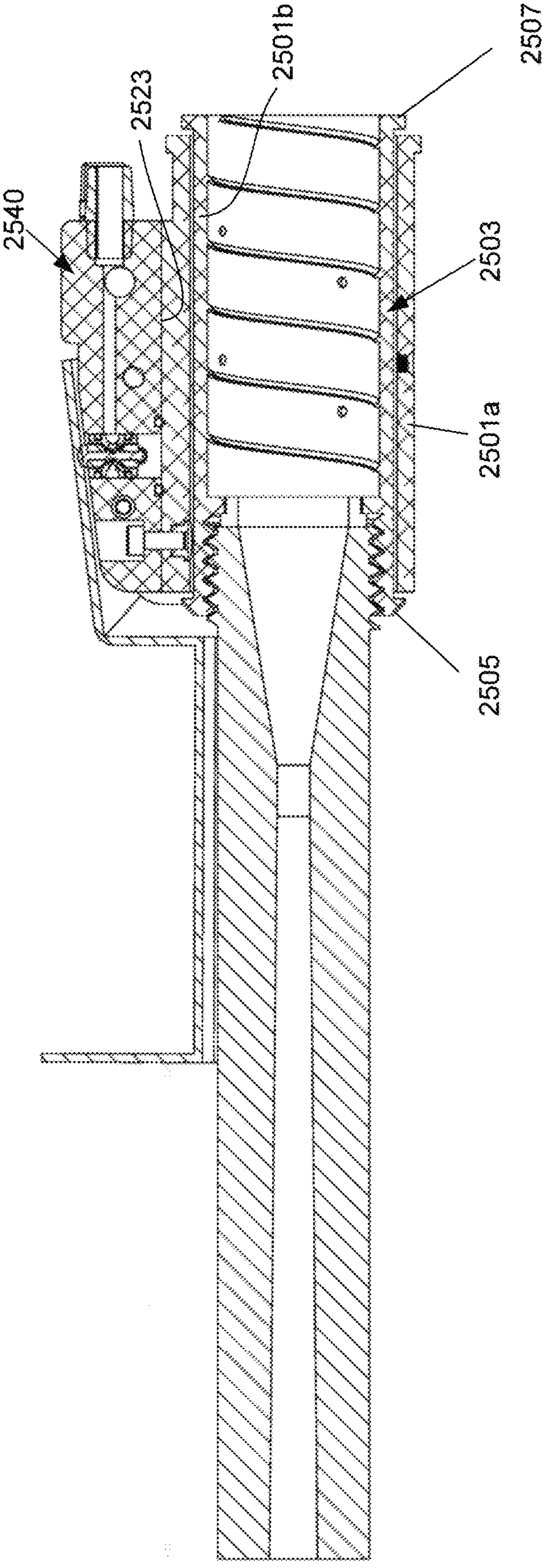
FIG. 26 is a longitudinal cross sectional view of the nozzle arrangement of FIG. 25.

FIGS. 19 and 20 are respectively schematic plan and side views. FIG. 21 is an elevation view, from a first end. FIG. 22 is a perspective view, from a second end. FIGS. 23 and 24 are respectively top and bottom schematic perspective views, showing internal detail, of the valve block 1401 of FIGS. 19 to 22.

The valve body 1401, is similar or identical to valve body 400, except as described below.

As can be seen best in FIGS. 19 and 21, in the valve body 1401, air inlet 1902 (corresponding broadly to air inlet 402 of valve body 400) is slightly offset from, but still in fluid connection with, main air inlet passage 1904 (corresponding broadly to main air inlet passage 404 of valve body 400). Similarly, second air outlet 1926 (corresponding broadly to second air outlet 426 of valve body 400) is slightly offset from, but still in fluid connection with, second air return passage 1924 (corresponding broadly to second air return passage 420, 424 of valve body 400). This allows corresponding air inlet and air outlet fittings (not shown, but corresponding to air inlet and air outlet fittings 502, 526) to be more widely spaced apart, facilitating connection of air lines, without increasing the size of the valve body.

As can be seen best in FIGS. 20, 22, 23 and 24, selector component receiving passage 1930 (corresponding broadly to selector component receiving passage 430 of valve body 400) is square in transverse cross section, which may also be incorporated in valve body 400, although not shown in FIGS. 3 to 9. This facilitates receipt of a selector component 1932, shown in FIG. 14, which is square in transverse cross section. This prevents the selector component 1932 rotating within the selector component receiving passage 1930, which could result in the passageway becoming misaligned. Of course, non-circular cross sectional shapes other than square could be used to similar effect. In a variation, the selector component receiving passage 1930 and selector component 1932 may each have a square (or other non-circular) tranverse cross sectional shape along part of their lengths and a circular cross sectional shape, which is easier to seal, along another part of their lengths. A further option is to provide the fluid passageway (corresponding in function to fluid passageway 576) in a manner that operates irrespective of the rotational position of the selector component, for example as a narrowed part, e.g. a part with a circumferential groove, of the selector component, allowing air to flow around the fluid passageway part of the selector component, rather than through the selector component, when (and only when) the selector part is in the corresponding position.

The selector component 1932 is provided with first and second spaced apart notches 1933, 1934 in an upper surface thereof, which can be engaged by a catch or detente arrangement (not shown) provided in a partially threaded bore 2310, best shown in FIGS. 19, 20 and 23, which connects with the selector component receiving passage 1930, as foreshadowed above. In an embodiment the détente arrangement is provided after inserting the selector component 1932 into the selector component receiving passage 1930, by inserting a ball bearing and a spring into the partially threaded bore 2310, and then inserting and tightening a grub screw so that the spring is somewhat compressed between the grub screw and the ball bearing. The ball bearing is thus biased against the selector component 1932, and can be located in either of the spaced apart notches 1933, 1934 to hold the selector component 1932 in position against inadvertent movement. Application of a substantial deliberate longitudinally directed force on the selector component 1932 forces the ball bearing upwardly, against the bias force of the spring, allowing the selector component 1932 to be moved. This arrangement allows the selector component 1932 to be substantially secured, in either of its two working positions corresponding to allowing or preventing air flow to the second air outlet 1926, against inadvertent movement that might, for example, result from inadvertent bumping or knocking of the selector component 1932, while still allowing a user to deliberately move the selector component 1932 from one position to the other, when desired. Friction between selector component 1932 and the internal walls of the selector component receiving passage 1930 may also play a part resisting movement of the selector component 1932, as there are very tight tolerances between the selector component 1932 and the internal walls of the selector component receiving passage 1930 (and/or any seals provided therebetween) to restrict the leakage of compressed air, and this should be taken into account when engineering the catch or detente arrangement.

Further, as best seen in FIGS. 20 and 24, in the valve body 1401 of nozzle arrangement 1400, control valve chamber 1960 (corresponding broadly to control valve chamber 410) is in fluid connection with an opening 2010 in an engagement surface 2012, of the valve body 1401, which engages and is received by the receiving surface 1423. When the valve body 1401 is properly mounted on the receiving surface 1423, escape of air from the opening is prevented, and the opening is effectively inoperative. A seal may be provided to ensure that escape of air is properly prevented, and a seal in the form of an O-ring 2011 is shown in FIG. 14. A seal or O-ring accommodating configuration 2014 is provided around the opening 2010.

The opening 2010 is provided so that if the valve body 1401 is removed from the receiving surface 1423 air is vented from the valve body 1401, preventing generation of the return signal required for supply of pressurised air to the blast hose, and thus effectively preventing operation of the abrasive blasting apparatus. This is considered useful, because it is not unknown for users of abrasive basting apparatus to find continuous operation of a dead man control to be arduous, and to remove the dead man control from the nozzle region of the blasting apparatus to fix the control lever in the operating position. Provision of the venting opening 2010 removes this option, as removal of the valve body 1401 will prevent operation, even if the control lever is fixed in its operating position.

Of course, while the venting opening 2010 in is illustrated and described as being in direct fluid communication with the control valve chamber, a functionally similar opening could, instead, be in fluid communication with some other part of the pneumatic circuit provided in the valve body, such as, for example, depth extension part 406 of the air inlet passage 404. In an electrical embodiment a corresponding result may be obtained by providing an electrically conductive part on a receiving surface for dead man control part (for example on a receiving surface provided on a nozzle holder or sleeve) which forms part of the circuitry of the dead man control, such that the circuit cannot be completed without inclusion of the electrically conductive part. In one envisaged further alternative, a pressure could be used.

FIGS. 25 to 28 illustrate a further nozzle arrangement 2500. Nozzle arrangement 2500 comprises a sleeve 2501 comprised of two opposed portions 2501*a*, 2501*b* that are fastened together, by means of Allen screws 2502 around a generally tubular conduit for compressed air such as a blast hose or an end connector 2503 of of a blast hose. The sleeve 2501 comprises a generally cylindrical body part with a generally cylindrical internal surface that is complementary to an external cylindrical surface of the blast hose connector 2503 and dimensioned to allow the sleeve 2501 to rotate about the blast hose connector 2503, in use. The sleeve 2501 is free to rotate around the connector 2503 but is prevented from sliding axially from the connector 2503 by retainers in the form of flanges 2505 and 2507 which are formed at opposed ends of the connector 2503. A circumferential groove 2509 is formed around an outside of the sleeve to accommodate a blast hose sheath.

A nozzle 320 is shown threadedly connected to the hose connector 2503. The sleeve 2501 further provides a region with a generally planar receiving surface 2523 for receiving a valve body 2540, which is very similar to valve body 400, except as described below.

Figure 27:
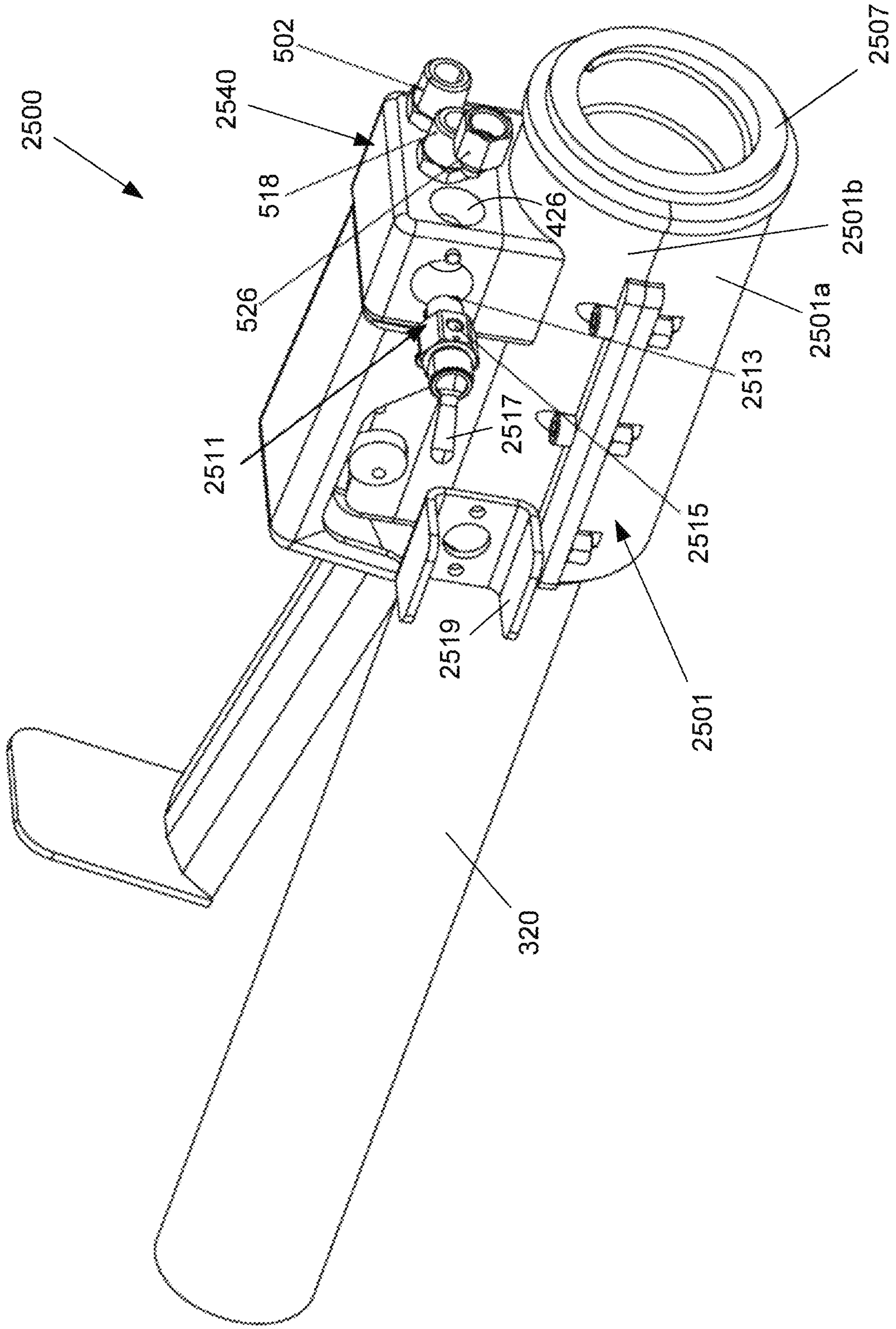
FIG. 27 is a further and partially exploded view of the nozzle arrangement of FIG. 25.

FIG. 27 is a somewhat exploded view of the nozzle arrangement 2500 wherein it can be seen that rather than having a selector component 530 or 1932, as has been described previously in relation to FIGS. 5 and 14 in the form of a longitudinal sliding member, instead a selector component is provided in the form of a toggle switch 2511. Depending on its position the toggle switch operates to either fluidly connect or disconnect switch inlet 2513 and switch outlet 2515. The switch outlet 2515 is connected to second air outlet 426 being the abrasive control air port and thereby to second air outlet fitting 526. The switch inlet 2513 is placed in fluid communication with the first air return passage 416. Consequently by changing the position of toggle 2517 the toggle switch 2511 an operator can send a signal to the meter valve 214 to add or to cease to add abrasive into the compressed air supply through the blast hose and thence the nozzle 320.

The toggle 2517 of the toggle switch 2511 is protected by a switch shield 2519 which prevents inadvertent operation of the toggle switch by the operator.

Figure 28:
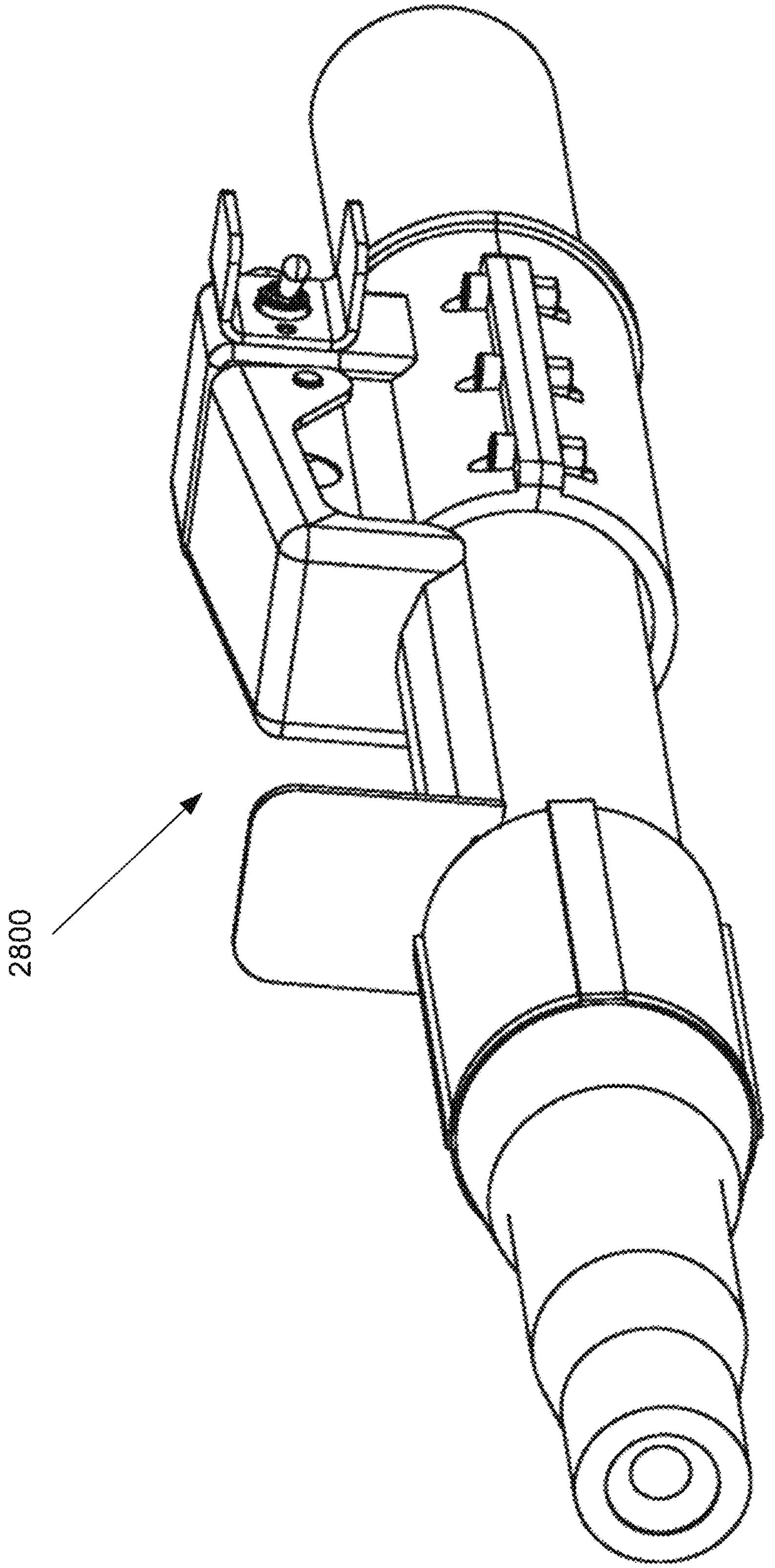
FIG. 28 depicts a further nozzle arrangement including a dead man control arrangement mounted non-rotatably about a blast hose.

FIG. 28 depicts a further embodiment being a nozzle arrangement 2800 which is mounted to the blast hose with the sleeve clamped thereon so that it is not rotational about the blast hose in this embodiment.

The described embodiments thus provide a number of working advantages over at least some previously used dead man control arrangements, and especially dead man controls previously used in abrasive blasting apparatus.

One advantage is the provision of a second dead man control signal, which allows a user to control a second operation (such as provision of abrasive) from the most frequently used control part of the apparatus (in the described embodiment, from the nozzle arrangement).

A second advantage is provision of a dead man control which can freely rotate relative to the functional tool part of the apparatus. In an abrasive blasting apparatus this can assist operation by making the nozzle arrangement easier to operate and/or mitigating twisting of the blast hose and/or reaction forces resulting from such twisting.

A third advantage is provision of a control lever which is easier and/or less fatiguing to operate. A significant contribution to this is made by the slot in the handle providing a reduced diameter or transverse size of the combined control lever and tool (especially compared to known arrangements in which the handle part must be held down onto the top of the dead man control apparatus, e.g. valve body, so that a user's hand must extend around the handle part, the valve body and the nozzle holder). Another contribution to this is made by the control lever arrangement resulting in the reaction thrust of the nozzle not making the control lever more difficult to retain in the operating position, and even facilitating such retention. Another contribution to this is providing the handle part of the control lever with at least one significantly dimensioned and effective hand retention part, as this can reduce the gripping force that needs to be applied avoid misplacing a user's hand, and therefore help reduce fatigue. Another contribution to this is made by the handle part of the control lever arrangement being positioned so that it is retained in its A fourth advantage is the venting arrangement (or electrical functional equivalent thereof) which prevents a signal required for operation of the apparatus being generated if the dead man control part is removed from the part of the apparatus on which it should be mounted.

A further advantage is provision of a dead man control arrangement having an operating part which is attached to a tool (such as a nozzle holder including, optionally, attachment to a rotatable sleeve associated with a nozzle holder) by means of easily removable fixings, exemplified by threaded fasteners such as screws in the described embodiments. Compared to a dead man control arrangement which is an integral part of, or difficult to remove from, the tool, this facilitates replacement of the operating part, for example to replace a damaged item or to change a pneumatic control to an electric control (or vice versa) and avoids the need to also replace an integral part of the tool (such as a nozzle holder). It will be appreciated that the provision of the fourth advantage, described above, contributes to the practicability of this further advantage, by avoiding unauthorised removal of the dead man control arrangement from tool.

It will be appreciated that although at least one of the described embodiments is considered to provide all of these advantages and contributions thereto, the present disclosure should be considered to encompass embodiments providing as few as one of these advantages or contributions thereto. For example, it may be considered that the second advantage proves sufficient ease of use that attempts to disconnect the dead man control become very unlikely, so that the venting arrangement that results in the fourth advantage is not required. Further, one or more of the described features and resultant advantages is not required, or is inapplicable, in dead man controls that are not intended for use apparatus having a nozzle, such as is present in abrasive blasting apparatus.

In compliance with the statute, the invention has been described in language more or less specific to structural or methodical features. The term "comprises" and its inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A dead man control arrangement for a blasting apparatus, the dead man control arrangement comprising:

a manually operable control part movable between a non-operating position, which prevents operation of the blasting apparatus, and an operating position, and biased towards the non-operating position;

a control signal governor which in response to the manually operable control part being in the operating position generates a first control signal for sending to a first remote controller arranged to allow a first operation of the blasting apparatus only upon receipt of the first control signal, and a second control signal for sending to a second remote controller of the blasting apparatus arranged to allow a second operation of the blasting apparatus only upon receipt of the second control signal, wherein the dead man control arrangement further comprises a selector, provided at the manually operable control part, for selecting whether or not the second control signal is sent to the second remote controller; and a control body, wherein the control signal governor, and first and second outlets for the respective first and second control signals, are provided on or in the control body, and wherein the manually operable control part is mounted to the control body.

2. The dead man control arrangement of claim 1, wherein the selector is mounted on or in the control body.

3. The dead man control arrangement of claim 1, wherein the control body is a valve body, providing a plurality of fluid passageways in fluid connection with a control valve.

4. The dead man control arrangement of claim 3, wherein the control signal governor comprises the control valve.

5. The dead man control arrangement of claim 1, wherein the first operation of the blasting apparatus comprises provision of pressurized gas to a blasting nozzle.

6. The dead man control arrangement of claim 5, wherein the second operation of the blasting apparatus comprises provision of an abrasive to the blasting nozzle.

7. The dead man control arrangement of claim 1, wherein the first control signal comprises pressurization of air.

8. The dead man control arrangement of claim 1, wherein the second control signal comprises pressurization of air.

9. The dead man control arrangement of claim 1, wherein the control signal governor comprises a connection arrangement operable to be in a connection condition which connects an output part of the dead man control arrangement to an input part of the dead man control arrangement and operable to be in an alternative, disconnection, condition, in which the output part is disconnected from the input part of the dead man control arrangement.

10. The dead man control arrangement of claim 9, wherein the connection condition allows at least part of an input to the dead man control arrangement to be transmitted to the output part of the dead man control arrangement to thereby generate at least one of the first and second control signals in the output part.

11. The dead man control arrangement of claim 10, wherein the connection arrangement is arranged to be in the disconnection condition in the absence of user input to retain it in the connection condition.

12. The dead man control arrangement of claim 9, wherein the connection arrangement comprises a valve.

13. The dead man control arrangement of claim 9, wherein the input part comprises a fluid passageway.

14. The dead man control arrangement of claim 13, wherein the fluid passageway of the input part comprises an input fluid transmission pathway.

15. The dead man control arrangement of claim 9, wherein the output part comprises a fluid passageway.

16. The dead man control arrangement of claim 15, wherein the fluid passageway of the output part comprises an output fluid transmission pathway.

17. The dead man control arrangement of claim 1, wherein the selector comprises a movable member, moveable between a position in which it prevents transmission of the second control signal and a position in which it allows transmission of the second control signal.

18. The dead man control arrangement of claim 17, wherein the selector comprises a toggle switch wherein the movable member comprises a toggle.

19. The dead man control arrangement of claim 18 including a shield about the toggle to prevent inadvertent operation thereof.

20. A dead man control arrangement for a blasting apparatus, the dead man control arrangement comprising:

a manually operable control part movable between a non-operating position, which prevents operation of the blasting apparatus, and an operating position, and biased towards the non-operating position;

a control signal governor which in response to the manually operable control part being in the operating position generates a first control signal for sending to a first remote controller arranged to allow a first operation of the blasting apparatus only upon receipt of the first control signal, and a second control signal for sending to a second remote controller of the blasting apparatus arranged to allow a second operation of the blasting apparatus only upon receipt of the second control signal, wherein the dead man control arrangement further comprises a selector, provided at the manually operable control part, for selecting whether or not the second control signal is sent to the second remote controller; and a control body, wherein the control signal governor, and first and second outlets for the respective first and second control signals, are provided on or in the control body, and wherein the selector is mounted on or in the control body.

* * * * *